(12) United States Patent
Li et al.

(10) Patent No.: US 11,160,049 B2
(45) Date of Patent: Oct. 26, 2021

(54) COMMUNICATIONS METHOD AND APPARATUS

(71) Applicant: HUAWEI TECHNOLOGIES CO., LTD., Guangdong (CN)

(72) Inventors: Meng Li, Beijing (CN); Jiangwei Ying, Beijing (CN); Yanmei Yang, Beijing (CN); Zhenglei Huang, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/790,515

(22) Filed: Feb. 13, 2020

(65) Prior Publication Data

US 2020/0187154 A1 Jun. 11, 2020

Related U.S. Application Data

(63) Continuation of application No. PCT/CN2018/080969, filed on Mar. 28, 2018.

(30) Foreign Application Priority Data

Aug. 15, 2017 (CN) .......................... 201710698733.0

(51) Int. Cl.
*H04W 68/00* (2009.01)
*H04W 76/27* (2018.01)
(Continued)

(52) U.S. Cl.
CPC ........... *H04W 68/005* (2013.01); *H04W 8/02* (2013.01); *H04W 64/00* (2013.01); *H04W 76/27* (2018.02); *H04W 88/02* (2013.01)

(58) Field of Classification Search
CPC ..... H04W 68/005; H04W 76/27; H04W 8/02; H04W 64/00; H04W 88/02; H04W 68/06;
(Continued)

(56) References Cited

U.S. PATENT DOCUMENTS 8,892,134 B2 * 11/2014 Nishida ............... H04L 65/1006
455/458
9,456,436 B2 * 9/2016 Young ............... H04W 72/0413
(Continued)

FOREIGN PATENT DOCUMENTS

CN 106658758 A 5/2017
CN 106851856 A 6/2017
(Continued)

OTHER PUBLICATIONS

Office Action issued in Australian Application No. 2018317224 dated Sep. 1, 2020, 5 pages.
(Continued)

*Primary Examiner* — Julio R Perez
(74) *Attorney, Agent, or Firm* — Fish & Richardson P.C.

(57) ABSTRACT

This application discloses a communications method and apparatus. The method includes: receiving, by a radio access network (RAN) node, a first message from an access and mobility management function (AMF) node, where the first message includes specified area related information of a terminal device, and the specified area related information is used to indicate a specified area of the terminal device; and when the RAN node determines, based on the specified area related information and first location information of the terminal device, that the terminal device moves out of the specified area, sending, by the RAN node, the first location information or first indication information to the AMF node or an SMF node, where the first indication information is used to indicate that the terminal device already moves out of the specified area.

11 Claims, 14 Drawing Sheets

(51) Int. Cl.
*H04W 8/02* (2009.01)
*H04W 64/00* (2009.01)
*H04W 88/02* (2009.01)

(58) Field of Classification Search
CPC ..... H04W 76/19; H04W 76/00; H04W 4/021; H04W 4/025; H04W 8/14
See application file for complete search history.

(56) References Cited

U.S. PATENT DOCUMENTS

| | | | | |
|---|---|---|---|---|
| 9,814,025 | B2* | 11/2017 | Jung | H04W 8/22 |
| 10,206,091 | B2* | 2/2019 | Ryu | H04W 24/08 |
| 2011/0319085 | A1* | 12/2011 | Ishii | H04W 88/06 |
| | | | | 455/436 |
| 2015/0092554 | A1* | 4/2015 | Mochizuki | H04W 88/06 |
| | | | | 370/235 |
| 2016/0142860 | A1* | 5/2016 | Kim | H04W 4/70 |
| | | | | 455/435.1 |
| 2017/0215224 | A1* | 7/2017 | Ke | H04W 8/005 |
| 2018/0317194 | A1* | 11/2018 | Chen | H04W 76/27 |
| 2019/0230625 | A1* | 7/2019 | Kim | H04W 76/27 |
| 2019/0335527 | A1* | 10/2019 | Byun | H04W 72/04 |
| 2020/0128420 | A1* | 4/2020 | Ryu | H04W 76/27 |

FOREIGN PATENT DOCUMENTS

| | | |
|---|---|---|
| CN | 107018542 A | 8/2017 |
| WO | 2016070936 A1 | 5/2016 |
| WO | 2017222290 A1 | 12/2017 |

OTHER PUBLICATIONS

3GPP TS 23.502 V0.5.0 (Jul. 2017), "3rd Generation Partnership Project; Technical Specification Group Services and System Aspects; Procedures for the 5G System; Stage 2 (Release 15)," Jul. 2017, 148 pages.
3GPP TS 38.300 V0.6.0 (Aug. 2017), 3rd Generation Partnership Project; Technical Specification Group Radio Access Network; NR; NR and NG-RAN Overall Description; Stage 2 (Release 15), Aug. 2017, 58 pages.
3GPP TS 23.501 V1.2.0 (Jul. 2017), "3rd Generation Partnership Project; Technical Specification Group Services and System Aspects; System Architecture for the 5G System; Stage 2 (Release 15)," Jul. 2017, 166 pages.
Ericsson, "23.502: Introduction of RRC Inactive state related procedures," 3GPP TSG-SA2 Meeting #120, S2-172300, Busan, Korea, Mar. 27-31, 2017, 13 pages.
Extended European Search Report issued in European Application No. 18845885.5 dated Jun. 29, 2020, 8 pages.
PCT International Search Report and Written Opinion issued in International Application No. PCT/CN2018/080969 dated Jun. 27, 2018, 18 pages (with English translation).
Samsung, "Discussion for LADN design considerations," 3GPP SA WG2 Meeting #S2-121, S2-172940, Hangzhou, China, May 15-19, 2017, 3 pages.
Ericsson et al., "RRC Inactive state—new procedures in TS 23.502," SA WG2 Meeting #122, S2-174351, San Jose Del Cabo, Mexico, Jun. 26-30, 2017, 15 pages.
ETRI, "TS 23.502: N2 Release Procedure," SA WG2 Meeting #119, S2-171091, Dubrovnik, Croatia, Feb. 13-17, 2017, 3 pages.
Nokia et al., "Text Proposal for RRC_Inactive mode," 3GPP TSG-RAN WG3#96, R3-171578, Hangzhou, P.R. China, May 15-19, 2017, 3 pages.
Office Action issued in Korean Application No. 2020-7007498 dated Jan. 21, 2021, 8 pages (with English translation).

* cited by examiner ns and Apparatus

COMMUNICATIONS METHOD AND APPARATUS

CROSS-REFERENCE TO RELATED APPLICATIONS

This application is a continuation of International Application No. PCT/CN 2018/080969, filed on Mar. 28, 2018, which claims priority to Chinese Patent Application No. 201710698733.0, filed on Aug. 15, 2017. The disclosures of the aforementioned applications are hereby incorporated by reference in their entireties.

TECHNICAL FIELD

This application relates to the field of wireless communications technologies, and in particular, to a communications method and apparatus.

BACKGROUND

A concept of a local area data network (LADN) is introduced in a 5G system. A terminal device can access an LADN only when the terminal device is within an LADN service area (LADN SA); otherwise, the terminal device cannot access the LADN.

When a data network (DN) node has downlink data, for example, downlink LADN data, to be sent to the terminal device, the DN node sends the to-be-sent downlink data to a radio access network (RAN) node by using a user plane function (UPF) node, and then the RAN node sends the data to the terminal device.

However, the LADN SA may be different from a service scope of the RAN node. As shown in FIG. 1, when the terminal device is at a location 1, it indicates that the terminal device is within both the LADN SA and the service scope of the RAN node. In this case, when receiving the downlink LADN data specific to the terminal device, the RAN node may send the downlink LADN data to the terminal device. However, when the terminal device moves from the location 1 to a location 2, it may be learned that, the terminal device already moves out of the LADN SA, but is still within the service scope of the RAN. In this case, if the RAN node receives the downlink LADN data specific to the terminal device, the RAN node still sends the downlink LADN data to the terminal device. Consequently, the terminal device can still receive the downlink LADN data after moving out of the LADN SA.

SUMMARY

Embodiments of this application provide a communications method, to resolve a problem that a terminal device can still receive downlink LADN data when moving out of an LADN SA.

To achieve the foregoing objectives, the following technical solutions are used in the embodiments of this application:

According to a first aspect, an embodiment of this application provides a communications method. The method includes: receiving, by a radio access network RAN node, a first message from an access and mobility management function AMF node, where the first message includes specified area related information of a terminal device, and the specified area related information is used to indicate a specified area of the terminal device; and when the RAN node determines, based on the specified area related information and first location information of the terminal device, that the terminal device moves out of the specified area, sending, by the RAN node, the first location information or first indication information to the AMF node or a session management function SMF node, where the first indication information is used to indicate that the terminal device already moves out of the specified area.

According to the method, the AMF node may send the specified area related information of the terminal device to the RAN node, and further, when determining that the terminal device moves out of the specified area, the RAN node may send the first location information or the first indication information to the AMF node or the SMF node, so that the AMF node or the SMF node can learn that the terminal device already moves out of the specified area, thereby ensuring that a specified service can be implemented only within the specified area. For example, if the specified area is an LADN SA, when determining that the terminal device moves out of the LADN SA, the RAN node notifies the AMF node or the SMF node that the terminal device already moves out of the LADN SA, and the SMF node can trigger a process of releasing a PDU session resource, thereby ensuring that the terminal device does not receive or send LADN data after moving out of the LADN SA.

In a possible design, the specified area is a local area data network service area LADN SA, a location reporting area, or an area of interest of the SMF node.

In a possible design, before the determining, by the RAN node based on the specified area related information and first location information of the terminal device, that the terminal device moves out of the specified area, the method further includes: when the RAN node determines to switch the terminal device from a Radio Resource Control RRC connected state to a Radio Resource Control inactive RRC inactive state, determining, by the RAN node, a radio access network notification area RNA of the terminal device based on second location information of the terminal device and the specified area related information; and sending, by the RAN node, a second message to the terminal device, where the second message is used to release an RRC connection between the terminal device and the RAN node, and the second message carries the RNA.

According to the communications method, the RAN node determines the RNA with reference to the specified area related information, so that the determined RNA is included in the specified area. Therefore, a case in which the terminal device moves out of the specified area but is still within the RNA is avoided, and when the specified area is the LADN SA, a problem that the terminal device in the RRC inactive state can still receive LADN data after moving out of the LADN SA is avoided.

In a possible design, the specified area related information includes a location area identifier list corresponding to the specified area; and a specific implementation method of determining, by the RAN node, an RNA of the terminal device based on second location information of the terminal device and the specified area related information is:

when a location indicated by the second location information is within an area indicated by the location area identifier list corresponding to the specified area, determining, by the RAN node, the RNA based on first reference information, where the RNA is included in the specified area, and the first reference information includes at least registration area information of the terminal device. It may be learned that, because the RNA is included in the specified area, the case in which the terminal device moves out of the specified area but is still within the RNA is avoided, and the problem that the terminal device can still receive LADN data within the RNA after moving out of the LADN SA can be avoided.

In a possible design, the specified area related information includes LADN SA related information, and the LADN SA related information includes a data network name DNN corresponding to the LADN SA; and a specific implementation method of determining, by the RAN node, an RNA of the terminal device based on second location information of the terminal device and the specified area related information is:

determining, by the RAN node based on the DNN and a mapping relationship between the DNN and a location area identifier list corresponding to the LADN SA, the location area identifier list corresponding to the LADN SA; and when a location indicated by the second location information is within an area indicated by the location area identifier list corresponding to the LADN SA, determining, by the RAN node, the RNA based on second reference information, where the second reference information includes at least registration area information of the terminal device, and the RNA is included in the LADN SA.

In a possible design, before the determining, by the RAN node based on the specified area related information and first location information of the terminal device, that the terminal device moves out of the specified area, the RAN node may receive a third message from the terminal device, where the third message is used to request, when the terminal device moves out of the RNA, to restore the RRC connection between the terminal device and the RAN node; and then the RAN node updates location information of the terminal device to the first location information.

In a possible design, the determining, by the RAN node based on the specified area related information and first location information of the terminal device, that the terminal device moves out of the specified area includes:

when a location indicated by the first location information is within none of areas indicated by location area identifiers in the location area identifier list corresponding to the specified area, determining, by the RAN node, that the terminal device moves out of the specified area.

According to a second aspect, an embodiment of this application provides a communications method, including: receiving, by a radio access network RAN node, a first message from an access and mobility management function AMF node, where the first message is used to instruct, when the RAN node determines to switch a terminal device from a Radio Resource Control RRC connected state to a Radio Resource Control inactive RRC inactive state, to send, to the AMF node, a notification message used to notify a state of the terminal device; and when the RAN node determines to switch the terminal device from the RRC connected state to the RRC inactive state, sending, by the RAN node, the notification message to the AMF node based on the first message.

According to the communications method, the AMF node may notify the RAN node in advance; when it is determined that the terminal device is to be switched from the RRC connected state to the RRC inactive state, the notification message used to notify the state of the terminal device needs to be sent to the AMF node; then the AMF node sends, to an SMF node, the notification message used to notify the state of the terminal device; and when receiving the notification message, the SMF node can determine that the terminal device is already in the RRC inactive state, and does not send LADN data to the terminal device, thereby avoiding a problem that the terminal device in the RRC inactive state can still receive LADN data after moving out of an LADN SA.

In a possible design, the first message carries first indication information, and the first indication information is used to instruct, when the RAN node determines to switch the terminal device from the RRC connected state to the RRC inactive state, the RAN node to send the notification message to the AMF node.

In a possible design, the first indication information includes specified area related information, and the specified area related information is used to indicate a specified area of the terminal device.

In a possible design, the specified area is a local area data network service area LADN SA, a location reporting area, or an area of interest of a session management function SMF node.

In a possible design, the specified area related information includes a location area identifier list corresponding to the specified area; or the specified area related information includes LADN SA related information, and the LADN SA related information includes a location area identifier list corresponding to the LADN SA; or the specified area related information includes LADN SA related information, and the LADN SA related information includes a data network name DNN corresponding to the LADN SA.

In a possible design, after the RAN node receives the first message from the AMF node, when the RAN node determines to switch the terminal device from the RRC connected state to the RRC inactive state, the RAN node determines a radio access network notification area RNA of the terminal device based on location information of the terminal device; and then the RAN node sends a second message to the terminal device, where the second message is used to instruct the terminal device to release an RRC connection to the RAN node, and the second message carries the RNA.

In a possible design, after the RAN node sends the notification message to the AMF node based on the first message, the RAN node may receive a third message from the AMF node, where the third message carries a packet data unit PDU session identifier, and the third message is used to instruct the RAN node to release a PDU session resource corresponding to the PDU session identifier; and then the RAN node releases the PDU session resource based on the third message.

According to the method, when determining that the state of the terminal device is the RRC inactive state, the SMF node may instruct a UPF node to release the PDU session resource, and further instruct, by exchanging signaling, the RAN node to release the PDU session resource. In this way, when the terminal device moves out of the specified area, there is no PDU session resource used for sending related service data. For example, the problem that the terminal device can still receive LADN data when moving out of the LADN SA is avoided.

In a possible design, the first message carries the specified area related information, and the specified area related information is used to indicate the specified area of the terminal device; and the method further includes: receiving, by the RAN node, a fourth message from the AMF node, where the fourth message is used to request to establish the RRC connection between the terminal device and the RAN node; then instructing, by the RAN node, the terminal device to establish the RRC connection between the terminal device and the RAN node; and further, when the RAN node determines, based on the specified area related information and the location information of the terminal device, that the terminal device moves out of the specified area, sending, by the RAN node, the location information of the terminal device or the first indication information to the AMF node or the SMF node, where the first indication information is used to indicate that the terminal device already moves out of the specified area.

According to the communications method, when obtaining downlink data of the terminal device, the UPF node notifies the RAN node by using the SMF node and the AMF node, so that the RAN node instructs the terminal device to establish the RRC connection between the terminal device and the RAN node, and further, the RAN node may determine the location information of the terminal device, and if the RAN node determines, based on the location information of the terminal device, that the terminal device already moves out of the specified area, the RAN node reports related information or a related message to the AMF node or the SMF node, so that the SMF node instructs the UPF node to release downlink LADN data or prolong buffering of downlink LADN data, thereby ensuring that the terminal device does not receive the downlink LADN data when moving out of the specified area.

According to a third aspect, an embodiment of this application provides a communications method, including: determining, by a radio access network RAN node, that a terminal device switches from a Radio Resource Control RRC connected state to a Radio Resource Control inactive RRC inactive state; and then sending, by the RAN node to an access and mobility management function AMF node, a notification message used to notify a state of the terminal device.

According to the method, when determining that the terminal device switches from the RRC connected state to the RRC inactive state, the RAN node sends, to the AMF node, the notification message used to notify the state of the terminal device; and when receiving the notification message, the AMF node can determine that the terminal device is already in the RRC inactive state, and does not send LADN data to the terminal device, thereby avoiding a problem that the terminal device in the RRC inactive state can still receive LADN data after moving out of an LADN SA.

In a possible design, before the RAN node determines that the terminal device switches from the RRC connected state to the RRC inactive state, the RAN node may determine a radio access network notification area RNA of the terminal device based on location information of the terminal device; and then the RAN node sends a first message to the terminal device, where the first message is used to instruct the terminal device to release an RRC connection to the RAN node, and the first message carries the RNA.

According to a fourth aspect, an embodiment of this application provides a communications method, including: sending, by an access and mobility management function AMF node, a first message to a radio access network RAN node, where the first message is used to instruct, when the RAN node determines to switch a terminal device from a Radio Resource Control RRC connected state to a Radio Resource Control inactive RRC inactive state, the RAN node to send, to the AMF node, a first notification message used to notify a state of the terminal device; receiving, by the AMF node, the first notification message from the RAN node; and then sending, by the AMF node, a second notification message to a session management function SMF node based on the first notification message, where the second notification message is used to notify the SMF node of the state of the terminal device.

In a possible design, after the AMF node sends the second notification message to the SMF node, the AMF node may receive a second message from the SMF node, where the second message carries a packet data unit PDU session identifier, and the second message is used to instruct the AMF node to instruct the RAN node to release a PDU session resource corresponding to the PDU session identifier; and then the AMF node sends a third message to the RAN node, where the third message carries the PDU session identifier, and the third message is used to instruct the RAN node to release the PDU session resource corresponding to the PDU session identifier.

In a possible design, the AMF node may send a fourth message to the RAN node, where the fourth message is used to request to establish an RRC connection between the terminal device and the RAN node.

In a possible design, after the AMF node sends the fourth message to the RAN node, the AMF node may receive location information of the terminal device from the RAN node, and when determining, based on specified area related information and the location information of the terminal device, that the terminal device moves out of the specified area, the AMF node sends first indication information to the SMF node, where the first indication information is used to indicate that the terminal device already moves out of the specified area, and the specified area related information is used to indicate the specified area of the terminal device; or the AMF node receives first indication information from the RAN node, and sends the first indication information to the SMF node, where the first indication information is used to indicate that the terminal device already moves out of a specified area of the terminal device; or the AMF node receives a response message of the fourth message from the RAN node, where the response message of the fourth message is used by the RAN node to reject establishment of the RRC connection between the terminal device and the RAN node.

According to a fifth aspect, an embodiment of this application provides a communications method, including: receiving, by a session management function SMF node, a notification message that is from an access and mobility management function AMF node and that is used to notify a state of the terminal device; when the notification message is used to notify that the state of the terminal device is a Radio Resource Control inactive RRC inactive state, sending, by the SMF node, a first message to a user plane function UPF node, where the first message is used to request the UPF node to release a packet data unit PDU session resource of the terminal device; receiving, by the SMF node, a second message from the UPF node, where the second message is used to notify the SMF node that the UPF node already releases the PDU session resource of the terminal device, and the second message carries a PDU session identifier of a PDU session of the terminal device; and sending, by the SMF node, a third message to the AMF node, where the third message carries the PDU session identifier, and the third message is used to trigger the AMF node to instruct the RAN node to release a PDU session resource corresponding to the PDU session identifier.

According to a sixth aspect, an embodiment of this application provides a communications apparatus. The apparatus can implement a function performed by the RAN node according to the first aspect, and the function may be implemented by hardware or may be implemented by executing corresponding software by hardware. The hardware or the software includes one or more modules corresponding to the foregoing function.

In a possible design, a structure of the apparatus includes a processor and a communications interface. The processor is configured to support the apparatus to perform a corresponding function in the foregoing method. The communications interface is configured to support communication between the apparatus and another network element. The apparatus may further include a memory. The memory is configured to couple to the processor, and stores a program instruction and data that are required by the apparatus.

According to a seventh aspect, an embodiment of this application provides a communications apparatus. The apparatus can implement a function performed by the RAN node according to the second aspect, and the function may be implemented by hardware or may be implemented by executing corresponding software by hardware. The hardware or the software includes one or more modules corresponding to the foregoing function.

In a possible design, a structure of the apparatus includes a processor and a communications interface. The processor is configured to support the apparatus to perform a corresponding function in the foregoing method. The communications interface is configured to support communication between the apparatus and another network element. The apparatus may further include a memory. The memory is configured to couple to the processor, and stores a program instruction and data that are required by the apparatus.

According to an eighth aspect, an embodiment of this application provides a communications apparatus. The apparatus can implement a function performed by the RAN node according to the third aspect, and the function may be implemented by hardware or may be implemented by executing corresponding software by hardware. The hardware or the software includes one or more modules corresponding to the foregoing function.

In a possible design, a structure of the apparatus includes a processor and a communications interface. The processor is configured to support the apparatus to perform a corresponding function in the foregoing method. The communications interface is configured to support communication between the apparatus and another network element. The apparatus may further include a memory. The memory is configured to couple to the processor, and stores a program instruction and data that are required by the apparatus.

According to a ninth aspect, an embodiment of this application provides a communications apparatus. The apparatus can implement a function performed by the AMF node according to the fourth aspect, and the function may be implemented by hardware or may be implemented by executing corresponding software by hardware. The hardware or the software includes one or more modules corresponding to the foregoing function.

In a possible design, a structure of the apparatus includes a processor and a communications interface. The processor is configured to support the apparatus to perform a corresponding function in the foregoing method. The communications interface is configured to support communication between the apparatus and another network element. The apparatus may further include a memory. The memory is configured to couple to the processor, and stores a program instruction and data that are required by the apparatus.

According to a tenth aspect, an embodiment of this application provides a communications apparatus. The apparatus can implement a function performed by the SMF node according to the fifth aspect, and the function may be implemented by hardware or may be implemented by executing corresponding software by hardware. The hardware or the software includes one or more modules corresponding to the foregoing function.

In a possible design, a structure of the apparatus includes a processor and a communications interface. The processor is configured to support the apparatus to perform a corresponding function in the foregoing method. The communications interface is configured to support communication between the apparatus and another network element. The apparatus may further include a memory. The memory is configured to couple to the processor, and stores a program instruction and data that are required by the apparatus.

According to an eleventh aspect, an embodiment of this application provides a communications system. The system includes the terminal device, the RAN node, the AMF node, the SMF node, and the UPF node according to the first aspect to the fifth aspect.

According to a twelfth aspect, a program is provided. When being executed by a processor, the program is configured to perform any method according to the first aspect.

According to a thirteenth aspect, a program is provided. When being executed by a processor, the program is configured to perform any method according to the second aspect.

According to a fourteenth aspect, a program is provided. When being executed by a processor, the program is configured to perform any method according to the third aspect.

According to a fifteenth aspect, a program is provided. When being executed by a processor, the program is configured to perform any method according to the fourth aspect.

According to a sixteenth aspect, a program is provided. When being executed by a processor, the program is configured to perform any method according to the fifth aspect.

According to a seventeenth aspect, a computer readable storage medium is provided, including the program according to the twelfth aspect.

According to an eighteenth aspect, a computer readable storage medium is provided, including the program according to the thirteenth aspect.

According to a nineteenth aspect, a computer readable storage medium is provided, including the program according to the fourteenth aspect.

According to a twentieth aspect, a computer readable storage medium is provided, including the program according to the fifteenth aspect.

According to a twenty-first aspect, a computer readable storage medium is provided, including the program according to the sixteenth aspect.

According to a twenty-second aspect, a RAN node is provided, including at least one processing element or chip configured to perform any method according to the first aspect.

According to a twenty-third aspect, a RAN node is provided, including at least one processing element or chip configured to perform any method according to the second aspect.

According to a twenty-fourth aspect, a RAN node is provided, including at least one processing element or chip configured to perform any method according to the third aspect.

According to a twenty-fifth aspect, an AMF node is provided, including at least one processing element or chip configured to perform any method according to the fourth aspect.

According to a twenty-sixth aspect, a RAN node is provided, including at least one processing element or chip configured to perform any method according to the fifth aspect.

Compared with the prior art, the AMF node may send the specified area related information of the terminal device to the RAN node, and further, when determining that the terminal device moves out of the specified area, the RAN node may send the first location information or the first indication information to the AMF node or the SMF node, so that the AMF node or the SMF node can learn that the terminal device already moves out of the specified area, thereby ensuring that the specified service can be implemented only within the specified area. For example, if the specified area is the LADN SA, when determining that the terminal device moves out of the LADN SA, the RAN node notifies the AMF node or the SMF node that the terminal device already moves out of the LADN SA, and the SMF node can trigger the process of releasing the PDU session resource, thereby ensuring that the terminal device does not receive or send the LADN data after moving out of the LADN SA.

DESCRIPTION OF EMBODIMENTS

Network architectures and service scenarios described in this application more clearly describe the technical solutions in this application, but are not intended to limit the technical solutions provided in this application. A person of ordinary skill in the art may know that as the network architectures evolve and a new business scenario emerges, the technical solutions provided in this application further apply to a similar technical problem.

It should be noted that the term "exemplary" or "for example" in this application means "used as an example, an illustration, or a description. Any embodiment or design scheme described as "exemplary" or "for example" in this application should not be explained as being more preferred or having more advantages than another embodiment or design scheme. Exactly, use of the term "example" is intended to present a concept in a specific manner.

In this application, "of", "relevant" and "corresponding" may be mixed during use. It should be noted that, when there is no need to emphasize a difference thereof, meanings expressed by them are the same.

Figure 1:
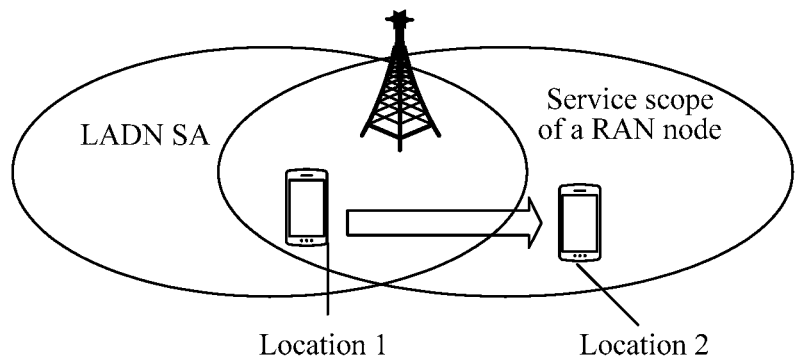
FIG. 1 is a schematic diagram of an example of a location of a terminal device provided in the Background.
Figure 2:
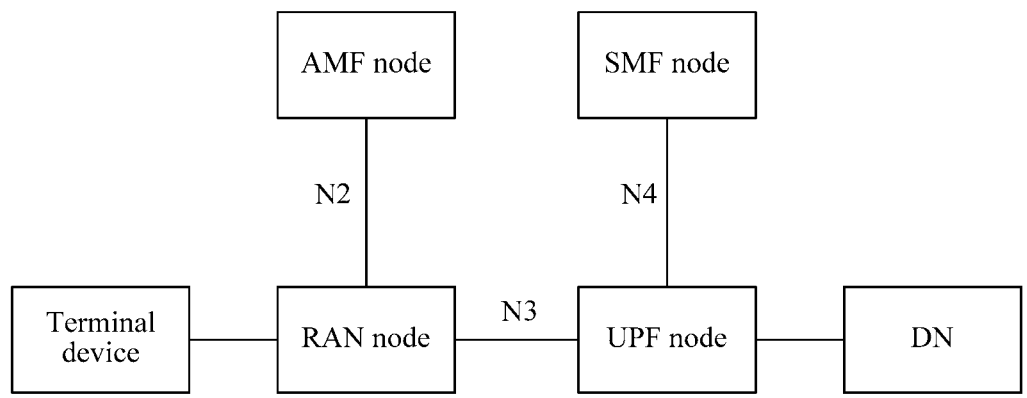
FIG. 2 is a schematic diagram of a network architecture according to an embodiment of this application.

As shown in FIG. 2, FIG. 2 shows a network structure. The network structure is applicable to a next generation communications system. Various components in the network structure are briefly described below:

A terminal device may include various handheld devices, in-vehicle devices, wearable devices, or computing devices that have a wireless communication function, or another processing device connected to a wireless modem, and various forms of terminals, mobile stations (MS), user equipment (UE), software clients, and the like, for example, a water meter, an electricity meter, or a sensor.

A RAN node is similar to a base station in a conventional network, provides a network access function to an authorized user within a specified area, and can use transmission tunnels of different quality based on user levels, service requirements, and the like. The RAN can manage a radio resource and provide an access service to a terminal device, to complete forwarding of a control signal and user data between the terminal device and a core network.

An access and mobility management function (AMF) node is responsible for mobility management, access management, and the like, and may be configured to implement a function in a mobility management entity (MME) function other than a session management function, for example, a lawful interception function and an access authorization function.

A session management function (SMF) node is configured to establish a session for the terminal device, allocate a session identifier (ID), manage and allocate an Internet Protocol (IP) address of a terminal device, and manage or terminate a session.

A data network (DN) is a network configured to provide external data, for example, the Internet.

A control plane function (CPF) node is mainly configured to perform access control and mobility management functions (for example, functions of an AMF) such as authentication, encryption, and location registration on a terminal device, and perform session management functions (for example, functions of an SMF) such as establishment, release, and change of a user plane transmission path. For ease of understanding, the CPF node may be considered as a set including network elements such as the AMF node and the SMF node.

An N2 interface is a reference point between the (R)AN node and the AMF node and is configured to send a non-access stratum (NAS) message or the like.

An N3 interface is a reference point between the (R)AN node and the UPF node and is configured to transmit user plane data or the like.

An N4 interface is a reference point between the SMF node and the UPF node and is configured to transmit information such as tunnel identifier information of an N3 connection, data buffering indication information, and a downlink data notification message.

An N6 interface is a reference point between the UPF node and a DN node and is configured to transmit user plane data or the like.

For ease of understanding, related technologies in this application are described as follows:

A connected state of a terminal device is a connection management-connected (CM-CONNECTED) state. The CM-connected state includes a Radio Resource Control connected (RRC Connected) state and a Radio Resource Control inactive (RRC inactive) state.

Figure 3:
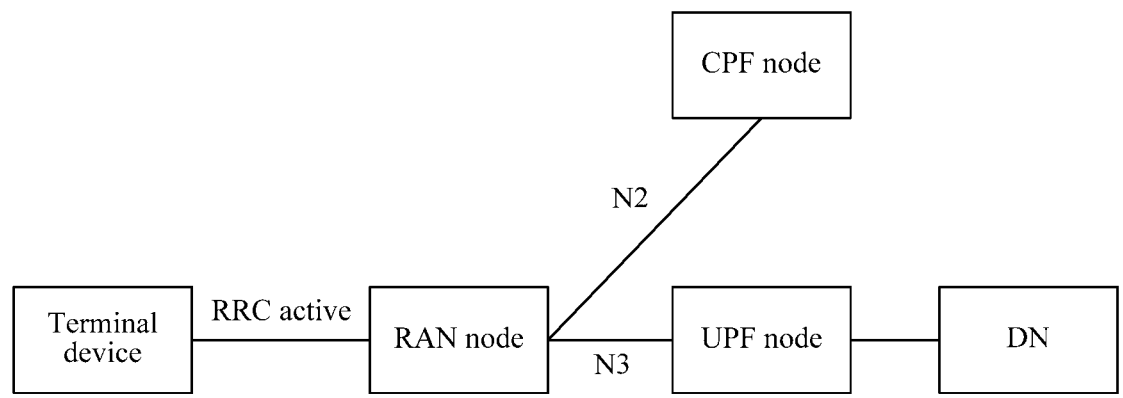
FIG. 3 is a schematic structural diagram of a communications system according to an embodiment of this application.

As shown in FIG. 3, FIG. 3 is a simplified architectural diagram of a communications system. When a terminal device needs to exchange data with a core network, the terminal device is in an RRC connected state, a RAN node is connected to a CPF node by using an N2 interface, and the RAN node is connected to a UPF by using an N3 interface. When the terminal device is in the RRC connected state, the RAN node may sense a cell that the terminal device camps on and location information of the terminal device, and a network element (for example, an AMF node) in the CPF node may sense the RAN node connected to the terminal device. In FIG. 3, when downlink data in a DN is transmitted to the UPF node, the UPF node may send the downlink data to the RAN node connected to the terminal device, and then the RAN node sends the downlink data to the terminal device.

Figure 4:
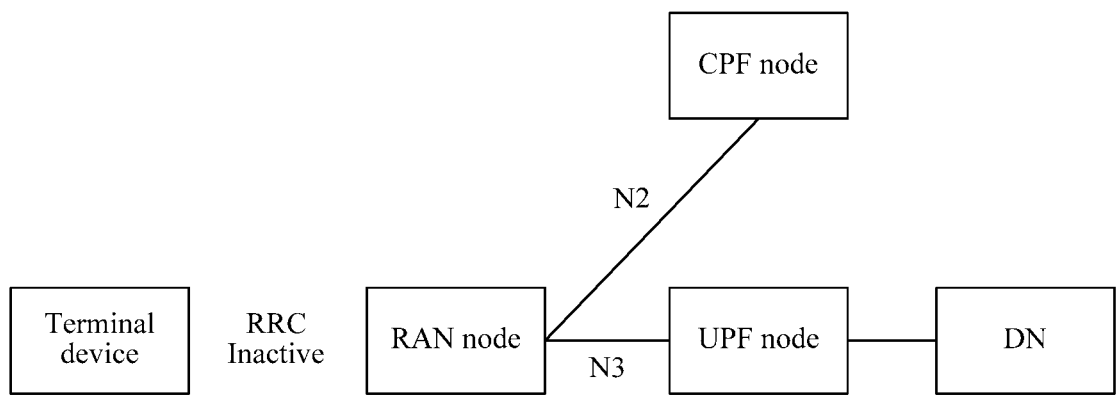
FIG. 4 is a schematic structural diagram of another communications system according to an embodiment of this application.

When the terminal device in the RRC connected state performs no data transmission within a preset time period, the RAN node determines, according to a preset policy, whether the terminal device should be switched from the RRC connected state to an RRC inactive state. When the terminal device is in the RRC inactive state, as shown in FIG. 4, an RRC connection between the terminal device and the RAN node is released, and an N2 connection between the RAN node and the CPF node and an N3 connection between the RAN node and the UPF are kept. When the RAN node determines to switch the terminal device from the RRC connected state to the RRC inactive state, the RAN node sets a radio access network notification area (RAN Notification Area, RNA) for the terminal device based on the location information of the terminal device, and then sends an RRC connection release message to the terminal device. The RRC connection release message carries the RNA. After receiving the RRC connection release message, the terminal device releases the RRC connection to the RAN node, and stores the RNA. In the RRC inactive state, no signaling is exchanged between the RAN node and the terminal device, so that the RAN node cannot sense the location information of the terminal device. During movement of the terminal device, the terminal device senses cell information broadcast by a base station, and determines the location information of the terminal device. When determining that the terminal device moves out of the RNA, the terminal device sends an RRC connection restoration request to the RAN node, to re-establish the RRC connection to the RAN node. If the RAN determines that the terminal device still needs to be switched to the RRC inactive state, the RAN re-determines an RNA of the terminal device based on newest location information of the terminal device.

It should be noted that, the RNA that is set by the RAN node for the terminal device may be smaller than an actual service scope of the RAN node. In this way, when the terminal device moves out of the RNA that is set by the RAN node for the terminal device, the terminal device can still access the same RAN node, and then the RAN node re-sets an RNA for the terminal device. Alternatively, after moving out of the RNA that is set by the RAN node for the terminal device, the terminal device may access another RAN, and the another RAN sets an RNA for the terminal device.

In addition, when the terminal device is in the RRC inactive state, because the N2 connection still exists between the CPF node and the RAN node, the CPF node still considers that the terminal device is in the connected state; when receiving downlink data specific to the terminal device, the UPF node still sends the downlink data to the RAN node; after receiving the downlink data, the RAN node initiates paging to the terminal device within the RNA; and after receiving a paging message from the RAN node, the terminal device is switched to the RRC connected state again, and then the RAN node sends the downlink data to the terminal device.

When the terminal device accesses an LADN, if the terminal device needs to send uplink LADN data, and the terminal device already establishes a packet data unit (Packet Data Unit, PDU) session transmission channel to the LADN, the terminal device may send the uplink LADN data by using a PDU session resource. When sensing that the terminal device moves out of an LADN SA, a network element in the CPF node releases the PDU session resource. However, when the terminal device needs to send uplink LADN data, but no PDU session transmission channel exists between the terminal device and the LADN, if the terminal device determines that the terminal device is within the LADN SA, the terminal device sends, to the CPF node, a request for establishing a PDU session transmission channel. In addition, the RAN node reports, to the CPF node, information about a cell to which the terminal device belongs; and then the CPF node may determine the location information of the terminal device, and determine, based on the location information of the terminal device, whether the terminal device is within the LADN SA. If the CPF node determines that the terminal device is within the LADN SA, the CPF node allows establishment of the PDU session transmission channel, so that the terminal device sends the uplink LADN data by using a PDU session resource.

When the terminal device accesses the LADN, if the UPF node receives downlink LADN data specific to the terminal device, and the terminal device already establishes a PDU session transmission channel to the LADN (to be specific, a user plane resource for a PDU session in the LADN is established), the UPF node may send the downlink LADN data to the RAN node, and then the RAN node sends the LADN data to the terminal device. However, if the UPF node receives downlink LADN data specific to the terminal device, but no PDU session transmission channel exists between the terminal device and the LADN, the UPF node may send a downlink data notification (Downlink Data Notification, DDN) message to an SMF node. After receiving the DDN message, the SMF node obtains the location information of the terminal device by using the AMF node, if the SMF node determines, based on the location information of the terminal device, that the terminal device is within the LADN SA, the SMF node triggers a process of establishing a PDU session transmission channel, so that after the PDU session channel is established, the UPF node may send the downlink LADN data to the terminal device by using the RAN node.

With reference to the foregoing descriptions, when the RAN receives the downlink data, if the RAN node determines that the terminal device is in the RRC connected state or the RRC inactive state, and the terminal device is within the service scope of the RAN node, the RAN node may send the downlink data to the terminal device. However, in the prior art, when sending the downlink data to the terminal device, the RAN node does not consider whether the terminal device is within the LADN SA. Consequently, a problem that the downlink LADN data is still sent to the terminal device when the terminal device already moves out of the LADN SA occurs.

On one hand, when the terminal device is always in the RRC connected state, if the terminal device is within an area covered by both the LADN SA and the service scope of the RAN node, the RAN node may send the downlink LADN data to the terminal device. If the terminal device in the RRC connected state moves out of the LADN SA but is still within the service scope of the RAN node, if the RAN node receives the downlink LADN data specific to the terminal device, because the RAN node does not know the LADN SA, the RAN node cannot determine whether the terminal device is within the LADN SA at this time, and therefore, the RAN node still sends downlink LADN SA data to the terminal device. Consequently, a problem that the terminal device can still receive the downlink LADN data after moving out of the LADN SA is caused.

Figure 5:
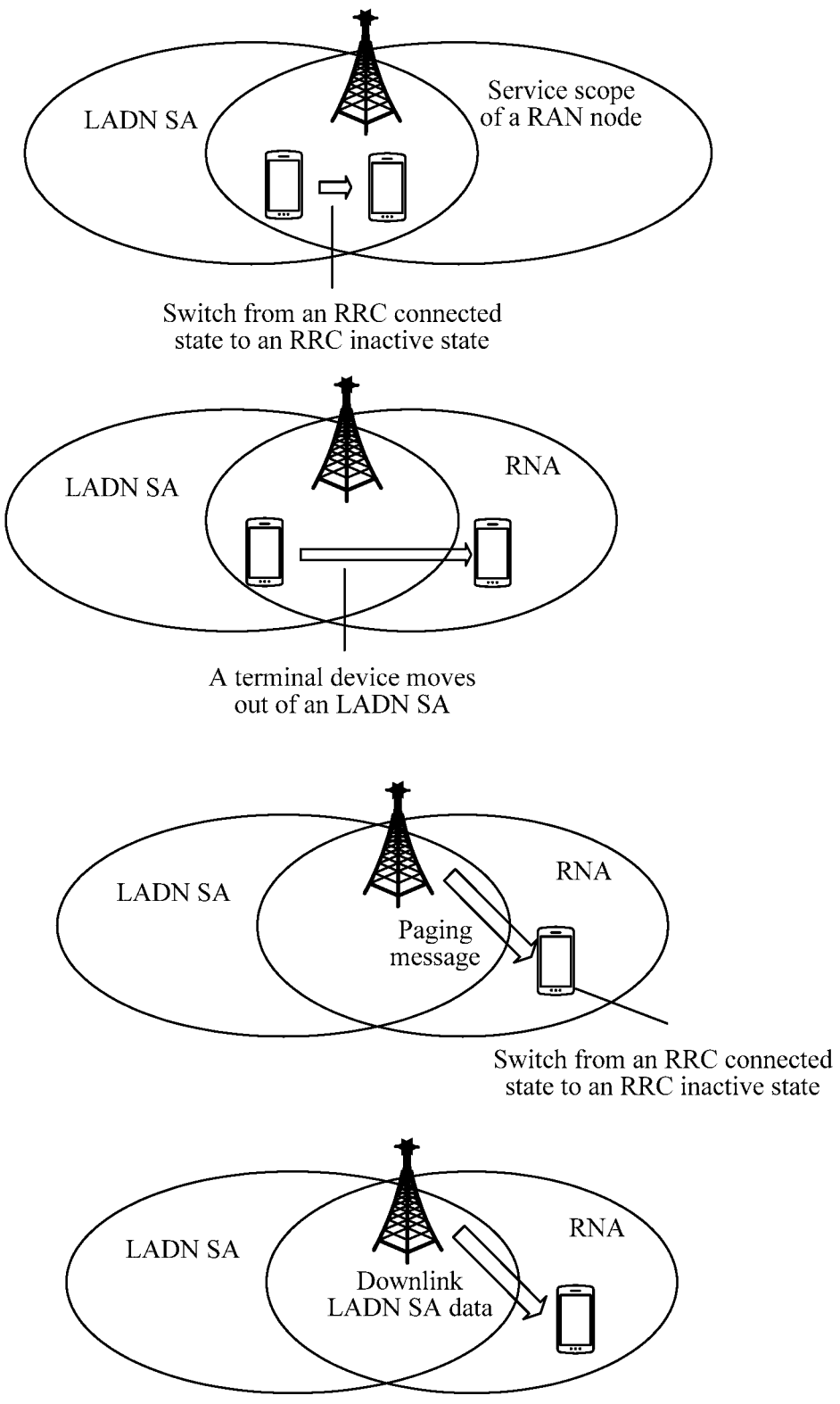
FIG. 5 is a schematic diagram of an example of a movement process of a terminal device according to an embodiment of this application.

On the other hand, as shown in FIG. 5, the terminal device is within an area covered by both the LADN SA and the service scope of the RAN node. In this case, the terminal device is switched from the RRC connected state to the RRC inactive state. The RAN node sets the RNA for the terminal device, and then the terminal device moves out of the LADN SA but is still within the RNA. Subsequently, the RAN node receives the downlink LADN data specific to the terminal device, and pages the terminal device within the RNA. After receiving a paging message, the terminal device is switched from the RRC inactive state to the RRC connected state, and then the RAN node sends the downlink LADN data to the terminal device. It may be learned that, in this case, the terminal device is already not within the LADN SA, but still receives the downlink LADN data.

To resolve the problem that the terminal device can still receive the LADN data after moving out of the LADN SA, a principle of this application is as follows: In a process of establishing an N2 connection to the RAN node, the AMF node sends LADN SA related information of the terminal device to the RAN, and then when determining, based on the location information of the terminal device and the LADN SA related information, that the terminal device moves out of the LADN SA, the RAN node may notify the AMF node or the SMF node that the terminal device already moves out of the LADN SA. In this way, the SMF node can release the PDU session resource of the terminal device or instruct the UPF node to prolong buffering of the downlink LADN SA data or discard the downlink LADN SA data. In this way, the terminal device does not receive the LADN data after moving out of the LADN SA.

Figure 6:
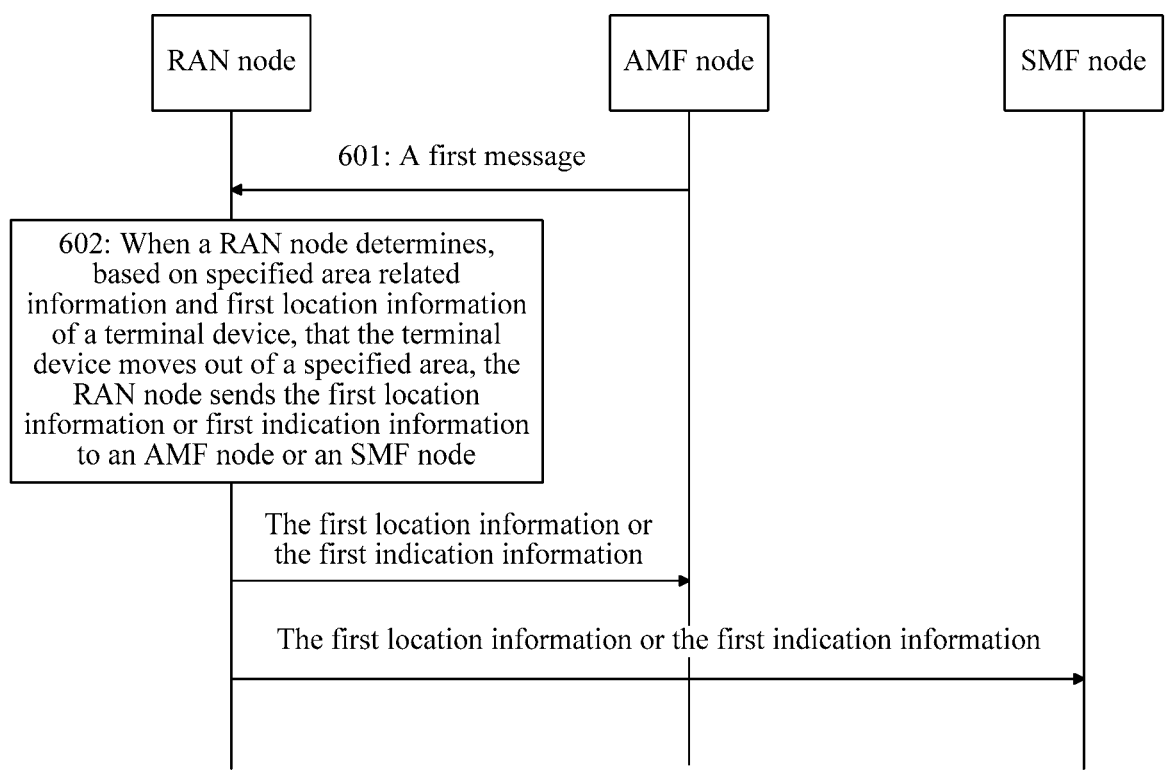
FIG. 6 is a flowchart of a communications method according to an embodiment of this application.

As shown in FIG. 6, an embodiment of this application provides a communications method. The method is applied to the communications system shown in FIG. 2, and the method includes the following steps.

601: A RAN node receives a first message from an AMF node.

Correspondingly, the AMF node receives the first message.

The first message may be an N2 connection activation message sent by the AMF node in a process of activating an N2 connection between the RAN node and the AMF node. For example, the N2 connection activation message may be specifically a path switch response (Path Switch Response) message. Alternatively, the first message may be a dedicated message used to carry specified area related information of the terminal device. Alternatively, the first message may be an N2 message sent by the AMF node to the RAN node during establishment of a PDU session, or a location reporting control message (Location Report Control message).

The first message includes the specified area related information of the terminal device, and the specified area related information is used to indicate a specified area of the terminal device. The specified area may be specifically an LADN SA, or a location reporting area (Location Reporting area), or an area of interest (Area of interest). The area of interest may be an area that interests an SMF node.

Optionally, the specified area related information includes a location area identifier list corresponding to the specified area, for example, a location area identifier list corresponding to the LADN SA, or a location area identifier list corresponding to the location reporting area.

The location area identifier list may be a cell identifier (Cell ID) list or may be a tracking area identity (TAI) list.

Optionally, the specified area related information includes LADN SA related information, and the LADN SA related information may include a location area identifier list corresponding to the LADN SA, or a data network name (DNN) corresponding to the LADN SA.

The location area identifier list corresponding to the LADN SA may be specifically a cell ID list or a tracking area list (TAL). The TAL may include at least one TAI.

The LADN SA may be a range within which one or more LADNs provide a service, and the DNN corresponding to the LADN SA may be names of the one or more LADNs.

For example, the specified area includes at least one location area, and the location area may be one cell or one tracking area, so that the location area identifier list corresponding to the specified area may be specifically a list including an identifier of the at least one location area included in the specified area. To be specific, the location area identifier list corresponding to the specified area is a list including location area identifiers of location areas included in the specified area. For example, it is assumed that the location area identifier list corresponding to the specified area includes a cell identifier 1, a cell identifier 2, and a cell identifier 3. It indicates that the specified area is coverage of a cell indicated by the cell identifier 1, coverage of a cell indicated by the cell identifier 2, and coverage of a cell indicated by the cell identifier 3.

602: When the RAN node determines, based on specified area related information and first location information of a terminal device, that the terminal device moves out of a specified area, the RAN node sends the first location information or first indication information to the AMF node or an SMF node.

Correspondingly, the AMF node or the SMF node receives the first location information or the first indication information.

The first indication information may be used to indicate that the terminal device already moves out of the specified area.

The first location information may be information about a cell that the terminal device camps on or information about a tracking area that the terminal device camps on when or after the terminal device is switched from an RRC inactive state to an RRC connected state.

For example, when the terminal device is switched from the RRC inactive state to the RRC connected state, the terminal device sends an RRC connection restoration request to the RAN node. The RAN node can learn, by receiving the RRC connection restoration request, of information about a cell accessed by the terminal device, and then determine the first location information of the terminal device based on location information of the cell. The first location information includes a cell identifier of the cell accessed by the terminal device and a TAI.

A method for determining, by the RAN node based on the specified area related information and the first location information of the terminal device, that the terminal device moves out of the specified area in step 602 may use the following two manners:

First manner: The specified area related information includes the location area identifier list corresponding to the specified area, and when a location indicated by the first location information is within none of areas indicated by location area identifiers in the location area identifier list corresponding to the specified area, the RAN node determines that the terminal device moves out of the specified area.

On the contrary, when a location indicated by the first location information is within an area indicated by any location area identifier in the location area identifier list corresponding to the specified area, the RAN node may determine that the terminal device does not move out of the specified area.

Second manner: The specified area related information includes the LADN SA related information, and the LADN SA related information includes a data network name DNN corresponding to the LADN SA. The RAN node determines, based on the DNN, and a mapping relationship between a DNN and a location area identifier list corresponding to an LADN SA, the location area identifier list corresponding to the LADN SA. When a location indicated by the first location information is within none of areas indicated by location area identifiers in the location area identifier list corresponding to the LADN SA, the RAN node determines that the terminal device moves out of the specified area.

Specifically, the specified area is the LADN SA, and the LADN SA related information includes the DNN corresponding to the LADN SA. The RAN node may determine, based on the DNN included in the LADN SA related information, and the mapping relationship between a DNN and a location area identifier list corresponding to an LADN SA, the location area identifier list corresponding to the LADN SA.

For example, the mapping relationship between a DNN and a location area identifier list corresponding to an LADN SA is shown in Table 1.

TABLE 1

| Location area identifier list 1 | DNN 1 |
| Location area identifier list 2 | DNN 2 |
| Location area identifier list 3 | DNN 3 |

If the LADN SA related information in the first message received by the RAN is the DNN 1, the RAN may find, based on Table 1, the location area identifier list 1 corresponding to the DNN 1, and may further determine that a total area including areas indicated by location area identifiers in the location area identifier list 1 is the LADN SA.

It should be noted that, that the RAN node sends the first location information or the first indication information to the AMF node or the SMF node may specifically include the following four cases:

First case: The RAN node sends the first location information to the AMF node.

Correspondingly, the method may further include: after receiving the first location information, determining, by the AMF node, whether the location indicated by the first location information is within the specified area, and if the AMF node determines that the location indicated by the first location information is not within the specified area, notifying, by the AMF node, the SMF node that the terminal device already moves out of the specified area.

Second case: The RAN node sends the first indication information to the AMF node.

Correspondingly, after the AMF node receives the first indication information, the AMF node sends the first indication information to the SMF node.

Third case: The RAN node sends the first location information to the SMF node.

Correspondingly, after receiving the first location information, the SMF node determines whether the location indicated by the first location information is within the specified area, and if the SMF node determines that the location indicated by the first location information is not within the specified area, the SMF node triggers a process of releasing a PDU session resource of the terminal device.

Fourth case: The RAN node sends the first indication information to the SMF node.

Correspondingly, the SMF node receives the first indication information, and when the first indication information indicates that the terminal device already moves out of the specified area, triggers a process of releasing a PDU session resource of the terminal device.

It should be noted that, the process of releasing the PDU session resource that is mentioned in the third case and the fourth case may be a process of releasing a PDU session or a process of deactivating a PDU session.

According to the method provided in the foregoing embodiment, the AMF node may send the specified area related information of the terminal device to the RAN node, and further, when determining that the terminal device moves out of the specified area, the RAN node may send the first location information or the first indication information to the AMF node or the SMF node, so that the AMF node or the SMF node can learn that the terminal device already moves out of the specified area, thereby ensuring that a specified service can be implemented only within the specified area. For example, if the specified area is the LADN SA, when determining that the terminal device moves out of the LADN SA, the RAN node notifies the AMF node or the SMF node that the terminal device already moves out of the LADN SA, and the SMF node can trigger the process of releasing the PDU session resource, thereby ensuring that the terminal device does not receive or send LADN data after moving out of the LADN SA.

Figure 7:
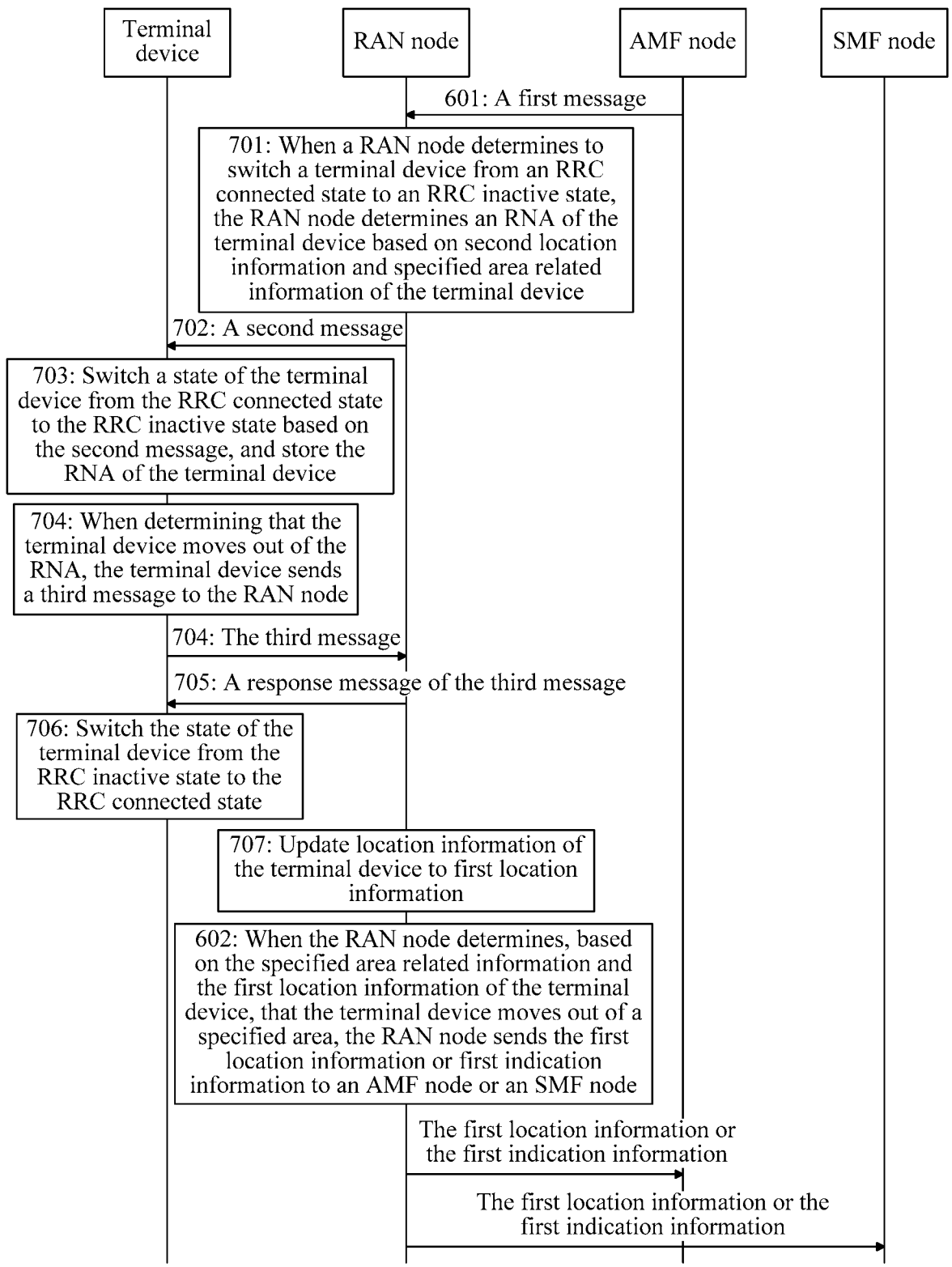
FIG. 7 is a flowchart of another communications method according to an embodiment of this application.

Optionally, in a first implementation scenario of the foregoing embodiment, as shown in FIG. 7, before step 602, the method further includes step 701 to step 703.

701: When the RAN node determines to switch a terminal device from an RRC connected state to an RRC inactive state, the RAN node determines an RNA of the terminal device based on second location information and specified area related information of the terminal device.

For example, the RAN node may determine, based on whether data is transmitted between the terminal device and the RAN node within a specified time period, whether to switch the terminal device from the RRC connected state to the RRC inactive state. If no data is transmitted between the terminal device and the RAN node within the specified time period, it is determined that the terminal device is to be switched from the RRC connected state to the RRC inactive state.

Further, the RAN node may determine, with reference to related parameters of the terminal device that are provided by the AMF node and whether data is transmitted between the terminal device and the RAN node within the specified time period, whether to switch the terminal device from the RRC connected state to the RRC inactive state. The related parameters of the terminal device that are provided by the AMF node may be parameters such as a registration area of the terminal device, discontinuous reception (DRX) information of the terminal device, and whether the terminal device is in mobile initiated connection only (MICO) mode.

For example, when the terminal device is not in MICO mode, and no data is transmitted between the terminal device and the RAN node within the specified time period, the RAN node determines to switch the terminal device from the RRC connected state to the RRC inactive state. If the terminal device is in MICO mode, the terminal device does not listen to a paging message, and the RAN node does not page the terminal device, so that the terminal device is not switched from the RRC connected state to the RRC inactive state.

In addition, a method for determining, by the RAN node based on these parameters, whether to switch the terminal device from the RRC connected state to the RRC inactive state is similar to that in the prior art, and details are not described herein one by one.

The determining, by the RAN node, an RNA of the terminal device based on second location information and specified area related information of the terminal device in step 701 may use the following two implementations:

First manner: The specified area related information includes the location area identifier list corresponding to the specified area. When a location indicated by the second location information is within an area indicated by the location area identifier list corresponding to the specified area, the RAN node determines the RNA based on first reference information. The RNA is included in the specified area, and the first reference information includes at least registration area information of the terminal device.

The registration area of the terminal device is a registration area indicated by the registration area information of the terminal device that is sent by the AMF node to the RAN node. The registration area is an area allocated by the AMF node to the terminal device, and is used to manage a location of the terminal device. When the terminal device moves out of the registration area, the terminal device needs to report newest location information of the terminal device to the AMF node.

The first reference information may further include any one or more of the following information:

whether a RAN node adjacent to a RAN node accessed by the terminal device supports the RRC inactive state of the terminal device;

whether there is an Xn interface between the RAN node accessed by the terminal device and the adjacent RAN node; and expected handover behavior (Expected HO behavior) information of the terminal device.

For example, if the RAN node adjacent to the RAN node accessed by the terminal device supports the RRC inactive state of the terminal device, the RNA may include both a service area of the RAN node accessed by the terminal device and a service area of the RAN node adjacent to the RAN node accessed by the terminal device.

If there is an Xn interface between the RAN node accessed by the terminal device and the adjacent RAN node, the RNA may include both a service area of the RAN node accessed by the terminal device and a service area of the RAN node adjacent to the RAN node accessed by the terminal device.

The expected handover behavior information of the terminal device may be an expected handover period of the terminal device. For example, if the terminal device moves fast, a handover time is short. To avoid frequent RNA handovers of the terminal device, a relatively large RNA may be set.

Figure 8:
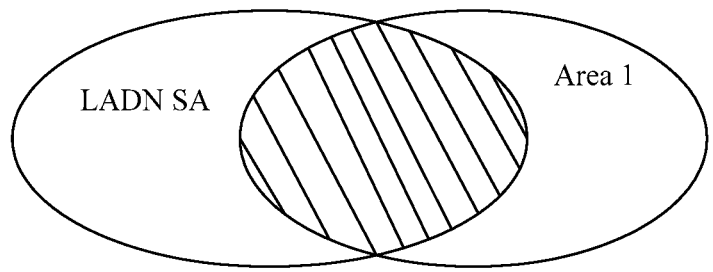
FIG. 8 is a schematic diagram of an example of an RNA according to an embodiment of this application.

The RAN node may determine an area based on the first reference information. An overlapping area between the area and the LADN SA is the RNA of the terminal device. Optionally, the RNA may be any sub area within an overlapping area between the area and the LADN SA. For example, as shown in FIG. 8, an area 1 is an area determined by the RAN node based on the first reference information, and the RNA of the terminal device that is determined by the RAN node may be a shadow area in FIG. 8 or any sub area within a shadow area.

Second manner: The specified area related information includes LADN SA related information, and the LADN SA related information includes a data network name DNN corresponding to the LADN SA. The RAN node determines, based on the DNN, and a mapping relationship between the DNN and the location area identifier list corresponding to the LADN SA, a location area identifier list corresponding to the LADN SA. When a location indicated by the second location information is within an area indicated by the location area identifier list corresponding to the LADN SA, the RAN node determines the RNA based on second reference information. The second reference information includes at least registration area information of the terminal device, and the RNA is included in the LADN SA.

The second reference information may further include any one or more of the following information:

whether a RAN node adjacent to a RAN node accessed by the terminal device supports the RRC inactive state of the terminal device;

whether there is an Xn interface between the RAN node accessed by the terminal device and the adjacent RAN node; and expected handover behavior information of the terminal device.

It should be noted that, the first reference information and the second reference information may be the same, and a method for determining the RNA by the RAN node based on the second reference information is the same as a method for determining the RNA by the RAN node based on the first reference information. Details are not described herein again.

The second location information may be information about a cell that the terminal device camps on or information about a tracking area that the terminal device camps on when the terminal device is switched from the RRC connected state to the RRC inactive state.

A method for obtaining the second location information may be as follows: The RAN node can obtain, by receiving a message sent by the terminal device, information about a cell accessed by the terminal device, and then determine the second location information of the terminal device based on the information about the cell.

702: The RAN node sends a second message to the terminal device.

The second message is used to release an RRC connection between the terminal device and the RAN node, and the second message carries the RNA. For example, the second message may be an RRC connection release message.

703: The terminal device receives a second message, and switches a state of the terminal device from the RRC connected state to the RRC inactive state based on the second message, and stores the RNA of the terminal device.

Further, when the terminal device is in the RRC inactive state, the location of the terminal device may change, and the method may further include step 704 to step 707.

704: When determining that the terminal device moves out of the RNA, the terminal device sends a third message to the RAN node.

Correspondingly, the RAN node receives the third message from the terminal device.

The third message is used to request, when the terminal device moves out of the RNA, to restore the RRC connection between the terminal device and the RAN node. For example, the third message may be an RRC connection restoration request message.

A method for determining, by the terminal device, that the terminal device moves out of the RNA is as follows: The terminal device may determine location information of the terminal device based on the information about the accessed cell. Because the terminal device stores the RNA, the terminal device can determine whether the location indicated by the location information of the terminal device is within the RNA, and when determining that the location indicated by the location information of the terminal device is not within the RNA, can determine that the terminal device moves out of the RNA.

It should be noted that, if the terminal device moves out of the RNA, the terminal device re-access the RAN node. If the re-accessed RAN node determines that the terminal device still needs to be switched to the RRC inactive state, the RAN node re-sets an RNA for the terminal device.

705: The RAN node sends a response message of the third message to the terminal device.

The response message of the third message is used to instruct the terminal device to establish the RRC connection to the RAN node.

706: The terminal device receives the response message of the third message, and switches the state of the terminal device from the RRC inactive state to the RRC connected state.

707: The RAN node updates location information of the terminal device to the first location information.

An execution order of step 705 and step 707 may be adjusted, and is not limited.

In a process in which the terminal device moves out of the RNA, the location information of the terminal device may change, and when the terminal device is in the RRC inactive state, the RAN node cannot obtain the location information of the terminal device. Therefore, to ensure accuracy of the location information of the terminal device that is stored in the RAN node, after the RAN node receives the third message or after the terminal device restores the RRC connection to the RAN node, the RAN node may obtain the information about the cell of the terminal device, and determine the first location information of the terminal device based on the information about the cell of the terminal device, and update the location information of the terminal device to the first location information.

For example, when the terminal device sends a message to the RAN node by using a channel, the RAN node may determine, based on a frequency or other information corresponding to the channel, the cell accessed by the terminal device, and further determine location information of the cell as the first location information of the terminal device.

Optionally, after updating the location information of the terminal device to the first location information, the RAN node can perform step 602.

According to the communications method provided in the foregoing implementation scenario, the RAN node determines the RNA with reference to the specified area related information, so that the determined RNA is included in the specified area. Therefore, a case in which the terminal device moves out of the specified area but is still within the RNA is avoided, and when the specified area is the LADN SA, a problem that the terminal device in the RRC inactive state can still receive LADN data after moving out of the LADN SA is avoided.

Figure 9:
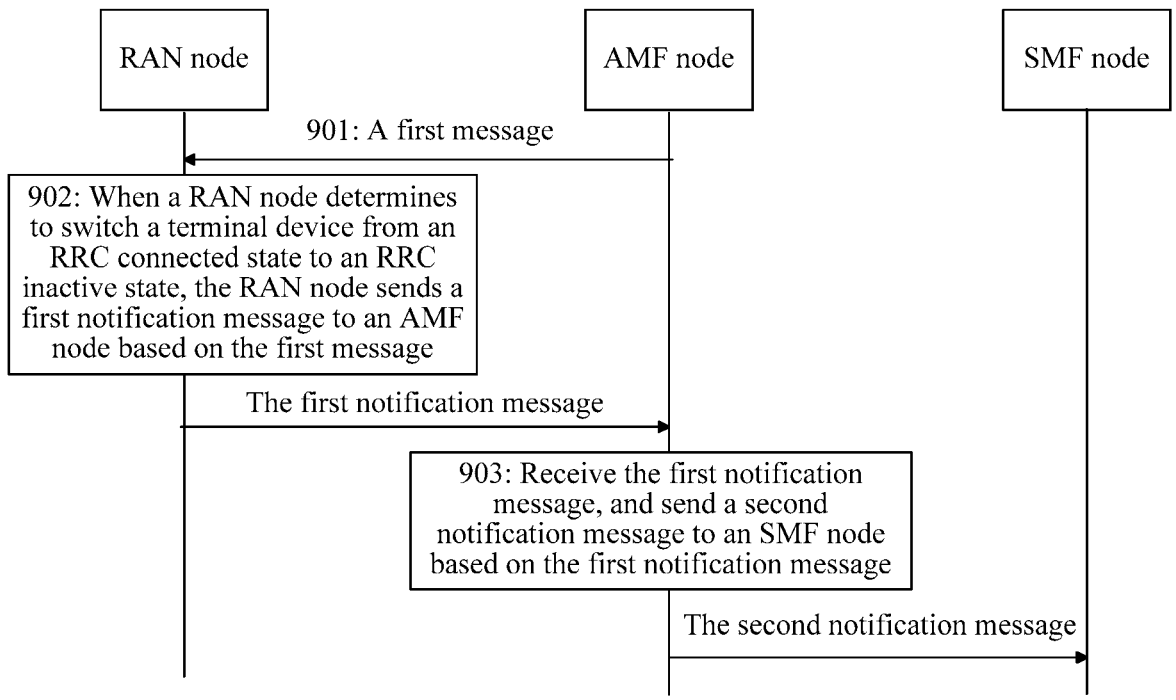
FIG. 9 is a flowchart of another communications method according to an embodiment of this application.

An embodiment of this application further provides a communications method. As shown in FIG. 9, the method includes the following steps.

901: An AMF node sends a first message to a RAN node.

Correspondingly, the RAN node receives the first message.

The first message is used to instruct, when the RAN node determines to switch a terminal device from an RRC connected state to an RRC inactive state, the RAN node to send, to the AMF node, a first notification message used to notify a state of the terminal device. For example, a name of the first message has the foregoing indication function. For another example, the first message carries indication information, and the indication information has the foregoing indication function.

For example, the first message may carry first indication information, and the first indication information is used to instruct, when the RAN node determines to switch the terminal device from the RRC connected state to the RRC inactive state, the RAN node to send the first notification message to the AMF node. The first indication information may be dedicated to the foregoing indication function, that is, an explicit indication manner. For example, the first indication information is indicated by using one bit, and when the bit is set to 1, the first indication information instructs, when the RAN node determines to switch the terminal device from the RRC connected state to the RRC inactive state, to send, to the AMF node, the first notification message used to notify the state of the terminal device. Alternatively, the first indication information may be an implicit indication manner. For example, the first indication information includes specified area related information, and the specified area related information is used to indicate a specified area of the terminal device.

The specified area may be an LADN SA, or a location reporting area, or an area of interest of an SMF node.

Optionally, the specified area related information includes a location area identifier list corresponding to the specified area. The location area identifier list may be a cell identifier list or a TAI list.

Optionally, the specified area related information includes LADN SA related information, and the LADN SA related information may include a location area identifier list corresponding to the LADN SA and/or a DNN corresponding to the LADN SA.

It should be noted that, for related terms such as the specified area, refer to related descriptions in the embodiment shown in FIG. 6, and details are not described again.

902: When the RAN node determines to switch a terminal device from an RRC connected state to an RRC inactive state, the RAN node sends a first notification message to the AMF node based on the first message.

The RAN node may determine, based on whether data is transmitted between the terminal device and the RAN node within a specified time period, whether to switch the terminal device from the RRC connected state to the RRC inactive state. If no data is transmitted between the terminal device and the RAN node within the specified time period, it may be determined that the terminal device is to be switched from the RRC connected state to the RRC inactive state. For a related method for determining, by the RAN node, to switch the terminal device from the RRC connected state to the RRC inactive state, refer to descriptions below step 701.

A method for sending, by the RAN node, the first notification message to the AMF node based on the first message may include:

when the first indication information is used to instruct, when the RAN node determines to switch the terminal device from the RRC connected state to the RRC inactive state, the RAN node to send the first notification message to the AMF node, sending the first notification message to the AMF node.

903: The AMF node receives the first notification message from the RAN node, and sends a second notification message to an SMF node based on the first notification message.

Correspondingly, the SMF node receives the first notification message from the AMF node.

The second notification message is used to notify the SMF node of the state of the terminal device.

Optionally, step 903 includes two implementations:

First implementation: The first notification message is the same as the second notification message. To be specific, after receiving the first notification message from the RAN node, the AMF node forwards the first notification message to the SMF node.

Second implementation: The AMF node receives the first notification message from the RAN node, reads content in the first message, and then adds, to the second notification message, information that is in the first notification message and that is used to indicate the state of the terminal device, and sends the second notification message to the SMF node. For example, the second notification message may be a state switching notification message, or a Namf_EventExposure_Notify message sent by the AMF node to the SMF node.

According to the communications method provided in the foregoing embodiment, the AMF node may notify the RAN node in advance; when it is determined that the terminal device is to be switched from the RRC connected state to the RRC inactive state, the notification message used to notify the state of the terminal device needs to be sent to the AMF node; then the AMF node sends, to the SMF node, the notification message used to notify the state of the terminal device; and when receiving the notification message, the SMF node can determine that the terminal device is already in the RRC inactive state, and does not send LADN data to the terminal device, thereby avoiding a problem that the terminal device in the RRC inactive state can still receive LADN data after moving out of the LADN SA.

Figure 10:
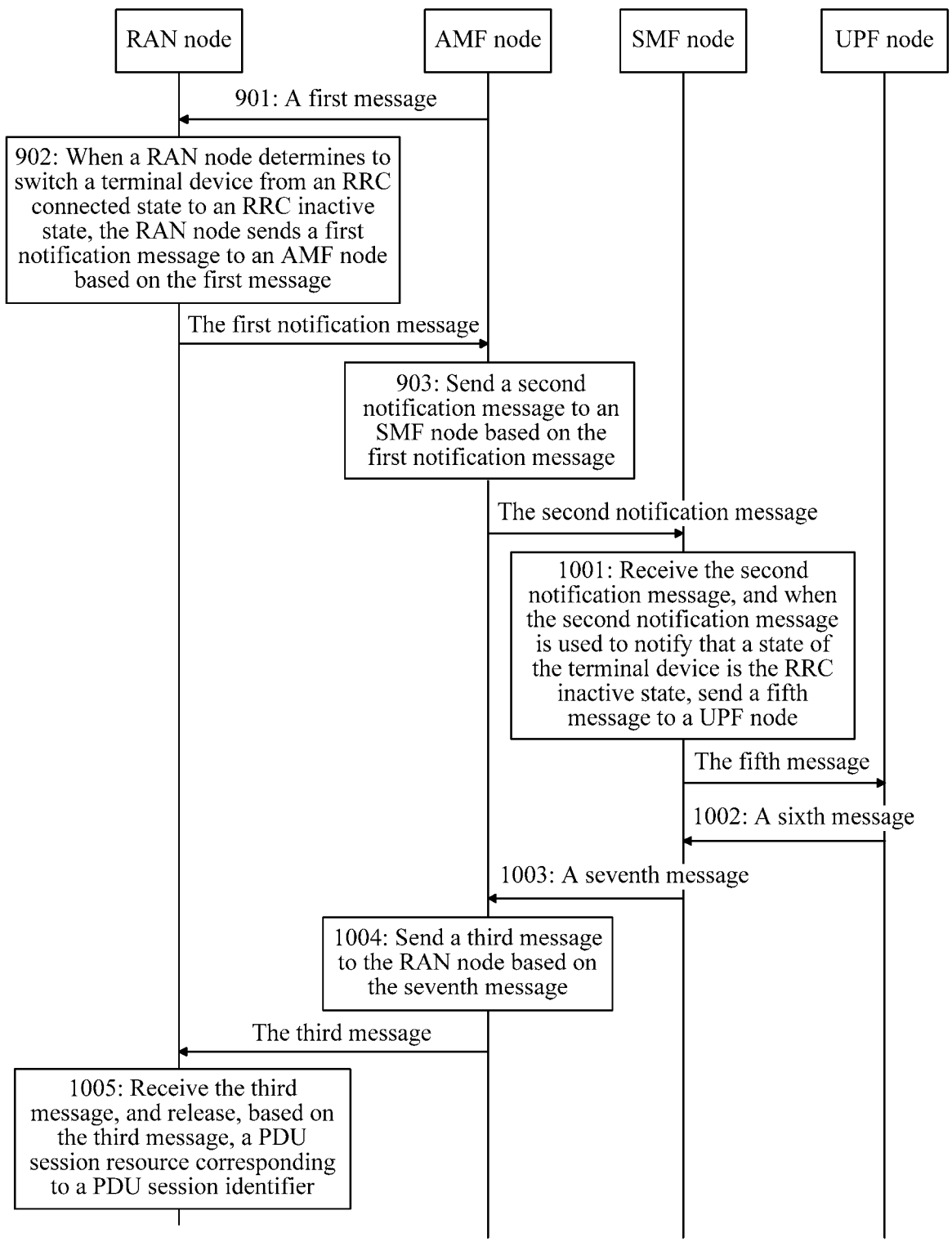
FIG. 10 is a flowchart of another communications method according to an embodiment of this application.

Optionally, in an implementation scenario of the foregoing embodiment shown in FIG. 9, as shown in FIG. 10, after step 903, the method further includes step 1001 to step 1005.

1001: The SMF node receives the second notification message, and when the second notification message is used to notify that a state of the terminal device is the RRC inactive state, the SMF node sends a fifth message to a UPF node, where the fifth message is used to request the UPF node to release a PDU session resource of the terminal device.

Correspondingly, the UPF node receives the fifth message.

It should be noted that, after receiving the fifth message, the UPF node releases the PDU session resource of the terminal device based on the fifth message.

1002: The UPF node sends a sixth message to the SMF node.

Correspondingly, the SMF node receives the sixth message from the UPF node.

The sixth message is used to notify the SMF node that the UPF node already releases the PDU session resource of the terminal device, and the sixth message carries a PDU session identifier of a PDU session of the terminal device.

1003: The SMF node sends a seventh message to the AMF node, where the seventh message carries a PDU session identifier, and the seventh message is used to instruct the RAN node to release a PDU session resource corresponding to the PDU session identifier.

1004: The AMF node receives the seventh message from the SMF node, and sends a third message to the RAN node based on the seventh message, where the third message carries the PDU session identifier, and the third message is used to instruct the RAN node to release the PDU session resource corresponding to the PDU session identifier.

1005: The RAN node receives the third message from the AMF node, and releases, based on the third message, the PDU session resource corresponding to the PDU session identifier.

According to the foregoing implementation scenario, when determining that the state of the terminal device is the RRC inactive state, the SMF node may instruct the UPF node to release the PDU session resource, and further instruct, by exchanging signaling, the RAN node to release the PDU session resource. In this way, when the terminal device moves out of the specified area, there is no PDU session resource used for sending related service data, for example, the problem that the terminal device can still receive LADN data when moving out of the LADN SA is avoided.

Figure 11:
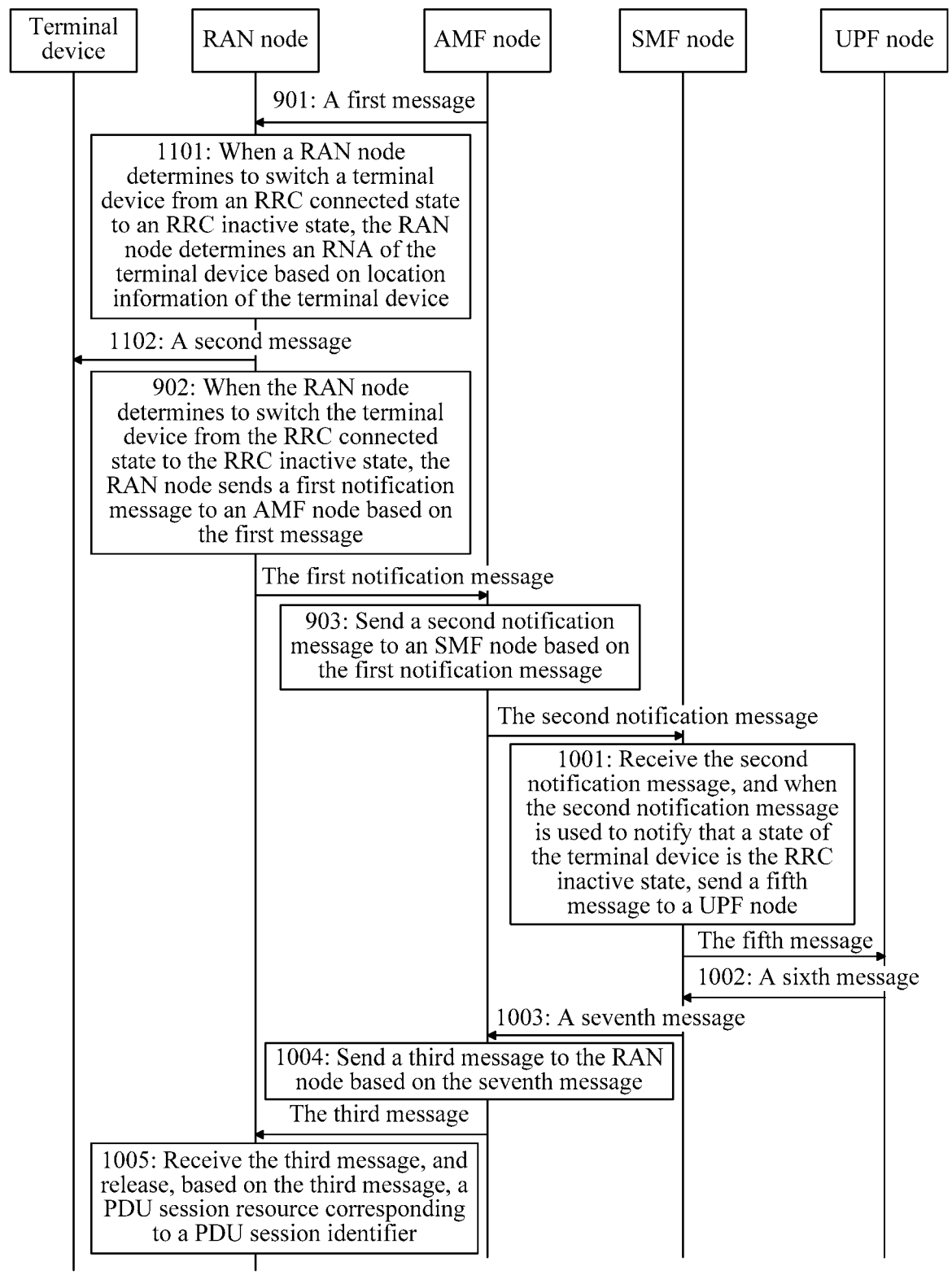
FIG. 11 is a flowchart of another communications method according to an embodiment of this application.

Optionally, in another implementation scenario of the embodiment shown in FIG. 9, as shown in FIG. 11, after the RAN node receives the first message from the AMF node in step 901, the method further includes step 1101 and step 1102.

1101: When the RAN node determines to switch the terminal device from the RRC connected state to the RRC inactive state, the RAN node determines an RNA of the terminal device based on location information of the terminal device.

For example, the RAN node determines a cell or a tracking area that is indicated by the location information of the terminal device as the RNA of the terminal device.

For example, the RAN node determines the RNA of the terminal device based on the location information of the terminal device and first reference information.

A location indicated by the location information of the terminal device is within the determined RNA of the terminal device.

The first reference information includes at least registration area information of the terminal device. The registration area information is used to indicate a registration area of the terminal device, and the registration area is an area allocated by the AMF node to the terminal device and is used to manage a location of the terminal device. When the terminal device moves out of the registration area, the terminal device reports newest location information of the terminal device to the AMF node. In addition, the registration area information of the terminal device may be sent by the AMF node to the RAN node.

Further, the first reference information may further include any one or more of the following information:

whether a RAN node adjacent to a RAN node accessed by the terminal device supports the RRC inactive state of the terminal device;

whether there is an Xn interface between the RAN node accessed by the terminal device and the adjacent RAN node; and expected handover behavior information of the terminal device.

For example, if the RAN node adjacent to the RAN node accessed by the terminal device supports the RRC inactive state of the terminal device, the RNA may include both a service area of the RAN node accessed by the terminal device and a service area of the RAN node adjacent to the RAN node accessed by the terminal device.

If there is an Xn interface between the RAN node accessed by the terminal device and the adjacent RAN node, the RNA may include both a service area of the RAN node accessed by the terminal device and a service area of the RAN node adjacent to the RAN node accessed by the terminal device.

The expected handover behavior information of the terminal device may be an expected handover period of the terminal device. For example, if the terminal device moves fast, a handover time is short. To avoid frequent RNA handovers of the terminal device, a relatively large RNA may be set.

1102: The RAN node sends a second message to the terminal device, where the second message is used to instruct the terminal device to release an RRC connection between the terminal device and the RAN node, and the second message carries the RNA.

Figure 12:
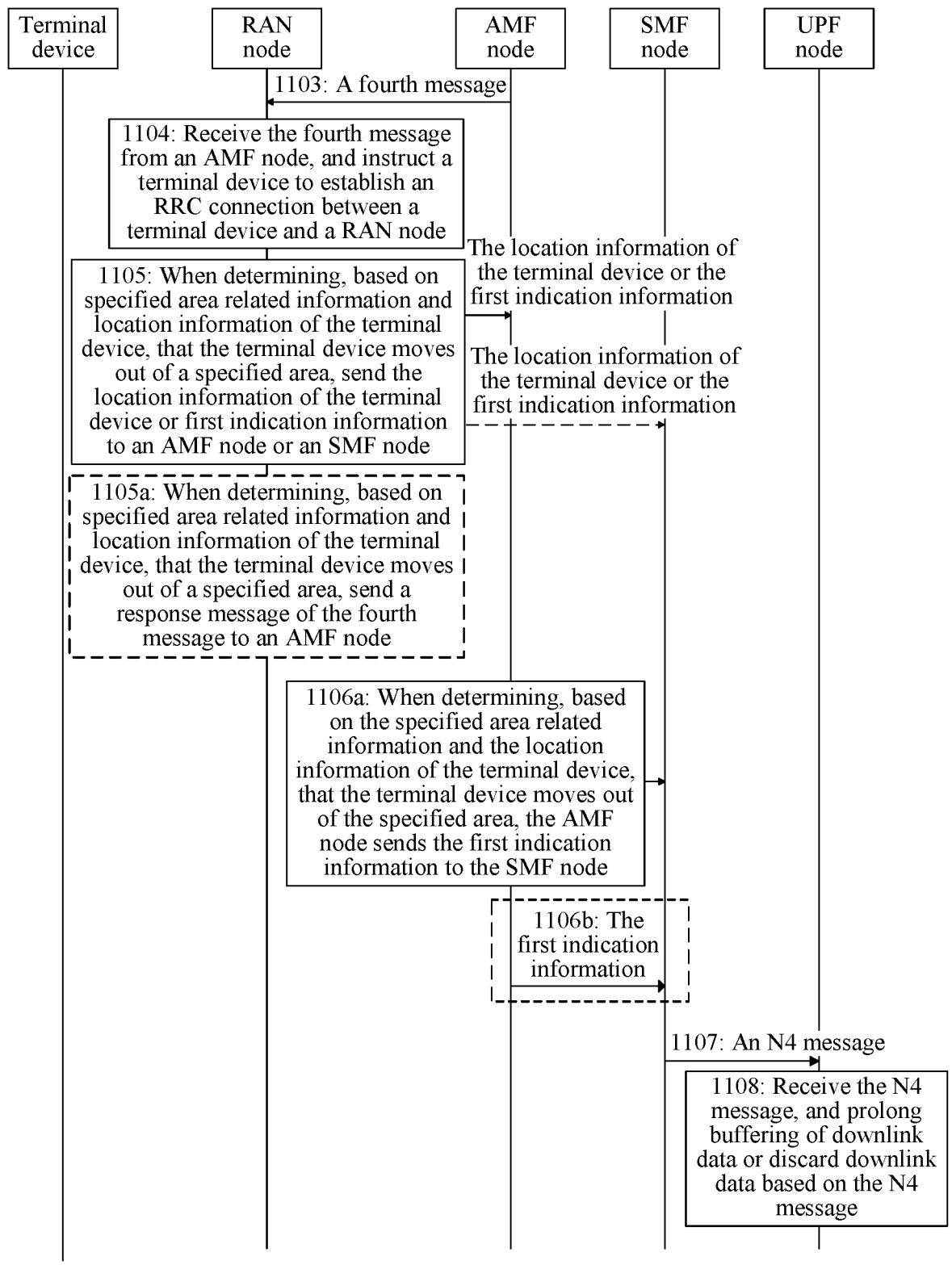
FIG. 12 is a flowchart of another communications method according to an embodiment of this application.

Optionally, in an implementation scenario of the embodiment shown in FIG. 11, after a procedure shown in FIG. 11 is performed, if the SMF node receives a downlink data notification (downlink data notification, DDN), the RRC connection between the terminal device and the RAN node is re-established. As shown in FIG. 12, the method includes the following steps.

1103: The AMF node sends a fourth message to the RAN node.

The fourth message is used to request to establish the RRC connection between the terminal device and the RAN node. For example, the fourth message may be an N2 message.

For example, when obtaining downlink LADN data, the UPF node sends a DDN message to the SMF node. The DDN message is used to notify the SMF node that the UPF node obtains the downlink LADN data. After receiving the DDN message, the SMF node sends an N11 message to the AMF node. The N11 message is used to request to establish a user plane resource. After receiving the N11 message, the AMF node sends the fourth message to the RAN node.

1104: The RAN node receives the fourth message from the AMF node, and instructs the terminal device to establish the RRC connection between the terminal device and the RAN node.

For example, the RAN node instructs, by sending a paging message to the terminal device, the terminal device to establish the RRC connection between the terminal device and the RAN node. For example, after receiving the fourth message, the RAN node initiates paging to the terminal device. After receiving the paging message from the RAN node, the terminal device sends an RRC connection restoration request to the RAN node. After receiving the RRC connection restoration request, the RAN node may obtain information about a cell accessed by the terminal device, and determine the location information of the terminal device based on the information about the cell.

1105: When the RAN node determines, based on specified area related information and location information of the terminal device, that the terminal device moves out of a specified area, the RAN node sends the location information of the terminal device or first indication information to the AMF node or the SMF node, where the first indication information is used to indicate that the terminal device already moves out of the specified area.

The specified area related information may be carried in the first message, and the specified area related information is used to indicate the specified area of the terminal device. The specified area may be specifically an LADN SA, or a location reporting area (Location Reporting area), or an area of interest (Area of interest) of the SMF node.

For a specific implementation of step 1105, refer to related descriptions of step 602, and details are not described herein again.

Optionally, after the sending, by the RAN node, the location information of the terminal device or first indication information to the AMF node or the SMF node, the method further includes the following steps.

If the RAN node sends the location information of the terminal device to the AMF node in step 1105, step 1106*a* needs to be performed.

The location information of the terminal device may be obtained in a manner in step 1104, and details are not described again.

1106*a*: When the AMF node determines, based on the specified area related information and the location information of the terminal device, that the terminal device moves out of the specified area, the AMF node sends the first indication information to the SMF node, where the first indication information is used to indicate that the terminal device already moves out of the specified area.

Optionally, if the RAN node sends the first indication information to the AMF node in step 1105, step 1106*a* may be replaced with 1106*b*.

1106*b*: The AMF node sends the first indication information to the SMF node, where the first indication information is used to indicate that the terminal device already moves out of the specified area of the terminal device.

Further optionally, after step 1106*a* or step 1106*b*, the method may further include the following steps.

1107: The SMF node sends an N4 message to the UPF node, where the N4 message is used to instruct the UPF node to prolong buffering of downlink data or discard downlink data.

For example, the N4 message is used to instruct the UPF node to prolong buffering of downlink LADN data or discard downlink LADN data.

1108: The SMF node receives the N4 message, and prolongs buffering of the downlink data or discards the downlink data based on the N4 message.

Optionally, step 1105 may be replaced with 1105a.

1105a: When the RAN node determines, based on the specified area related information and the location information of the terminal device, that the terminal device moves out of the specified area, the RAN node sends a response message of the fourth message to the AMF node.

The response message of the fourth message is used by the RAN node to reject establishment of the RRC connection between the terminal device and the RAN node.

Correspondingly, the AMF node receives the response message of the fourth message from the RAN node.

Further optionally, after step 1105a, step 1107 and step 1108 are performed.

According to the communications method provided in the foregoing implementation scenario, when obtaining downlink data of the terminal device, the UPF node notifies the RAN node by using the SMF node and the AMF node, so that the RAN node instructs the terminal device to establish the RRC connection between the terminal device and the RAN node, and further, the RAN node may determine the location information of the terminal device, and if the RAN node determines, based on the location information of the terminal device, that the terminal device already moves out of the specified area, the RAN node reports related information or a related message to the AMF node or the SMF node, so that the SMF node instructs the UPF node to release downlink LADN data or prolong buffering of downlink LADN data, thereby ensuring that the terminal device does not receive the downlink LADN data when moving out of the specified area.

Figure 13:
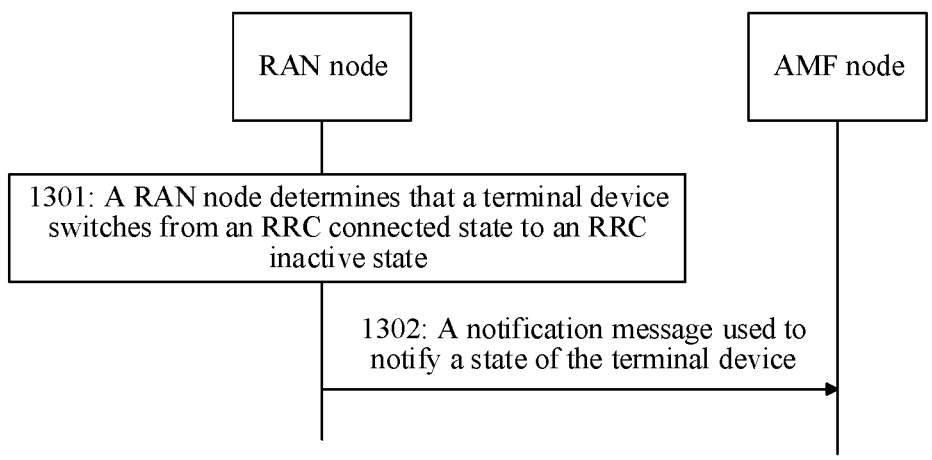
FIG. 13 is a flowchart of another communications method according to an embodiment of this application.

An embodiment of this application further provides a communications method. As shown in FIG. 13, the method includes the following steps.

1301: A RAN node determines that a terminal device switches from an RRC connected state to an RRC inactive state.

For example, the RAN node may determine, based on whether data is transmitted between the terminal device and the RAN node within a specified time period, whether to switch the terminal device from the RRC connected state to the RRC inactive state. If no data is transmitted between the terminal device and the RAN node within the specified time period, it may be determined that the terminal device is to be switched from the RRC connected state to the RRC inactive state.

For a specific implementation of step 1301, refer to related descriptions in the embodiment shown in FIG. 6, FIG. 7, or FIG. 8, and details are not described again.

1302: The RAN node sends, to an AMF node, a notification message used to notify a state of the terminal device.

For example, the state of the terminal device may be the RRC inactive state.

Correspondingly, the AMF node receives the notification message from the RAN node.

According to the communications method provided in this embodiment, when determining that the terminal device switches from the RRC connected state to the RRC inactive state, the RAN node sends, to the AMF node, the notification message used to notify the state of the terminal device; and when receiving the notification message, the AMF node can determine that the terminal device is already in the RRC inactive state, and does not send LADN data to the terminal device, thereby avoiding a problem that the terminal device in the RRC inactive state can still receive LADN data after moving out of an LADN SA.

Figure 14:
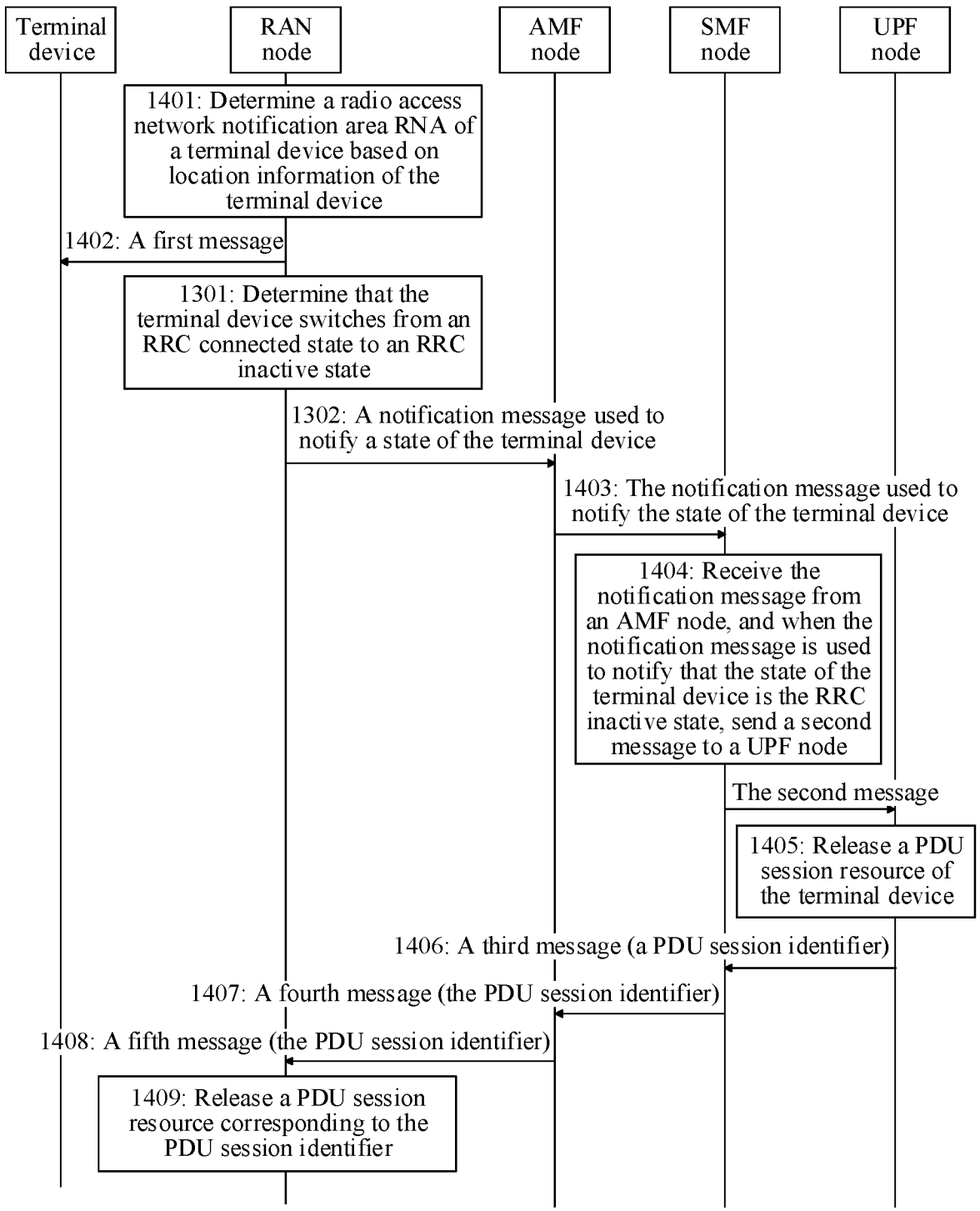
FIG. 14 is a flowchart of another communications method according to an embodiment of this application.

Optionally, in an implementation scenario of the foregoing embodiment, as shown in FIG. 14, before step 1301, the method further includes the following steps.

1401: The RAN node determines an RNA of the terminal device based on location information of the terminal device.

For step 1401, refer to related descriptions of step 1101, and details are not described again.

1402: The RAN node sends a first message to the terminal device.

Correspondingly, the terminal device receives the first message.

The first message is used to instruct the terminal device to release an RRC connection to the RAN node, and the first message carries the RNA.

Optionally, in another implementation scenario of the foregoing embodiment, after step 1302, the method further includes the following steps.

1403: The AMF node sends, to an SMF node, the notification message used to notify the state of the terminal device.

1404: The SMF node receives the notification message from the AMF node, and when the notification message is used to notify that the state of the terminal device is the RRC inactive state, the SMF node sends a second message to a UPF node.

The second message is used to request the UPF node to release a PDU session resource of the terminal device. For example, the first message may be a PDU session release request message.

1405: The UPF node receives the second message, and releases a PDU session resource of the terminal device.

1406: The UPF node sends a third message to the SMF node.

The third message is used to notify the SMF node that the UPF node already releases the PDU session resource of the terminal device, and the third message includes a PDU session identifier. The PDU session identifier is used to indicate a PDU session used to transmit data of the terminal device. For example, the third message may be a PDU session release response.

1407: The SMF node sends a fourth message to the AMF node.

The fourth message carries the PDU session identifier carried in the third message in step 1406, and the fourth message is used to trigger the AMF node to instruct the RAN node to release a PDU session resource corresponding to the PDU session identifier.

1408: The AMF node receives the fourth message, and sends a fifth message to the RAN node.

The fifth message includes the PDU session identifier carried in the fourth message in step 1407. The fifth message is used to instruct the RAN node to release the PDU session resource corresponding to the PDU session identifier.

1409: The RAN node receives the fifth message, and releases a PDU session resource corresponding to the PDU session identifier.

It should be noted that, the foregoing embodiments may be mutually learned and referenced, and same or similar descriptions are not repeated.

The solutions provided in the embodiments of the present invention are mainly described above from the perspective of interaction between the RAN node, the AMF node, and the SMF node. It may be understood that, the RAN node, the AMF node, and the SMF node each include a corresponding hardware structure and/or software module that performs various functions. A person skilled in the art should be easily aware that, in combination with the units and algorithm steps of the examples described in the embodiments disclosed in this specification, this application can be implemented by hardware or a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of this application, functional modules in the SMF node may be divided according to the foregoing method example. For example, the functional modules may be divided corresponding to the functions. Alternatively, two or more functions may be integrated into a processing module. The integrated module may be implemented in a form of hardware, or may be implemented in a form of a software functional module. It should be noted that division of the modules in the embodiments of this application is an example, and is merely logical function division. During actual implementation, there may be another division manner.

Figure 15:
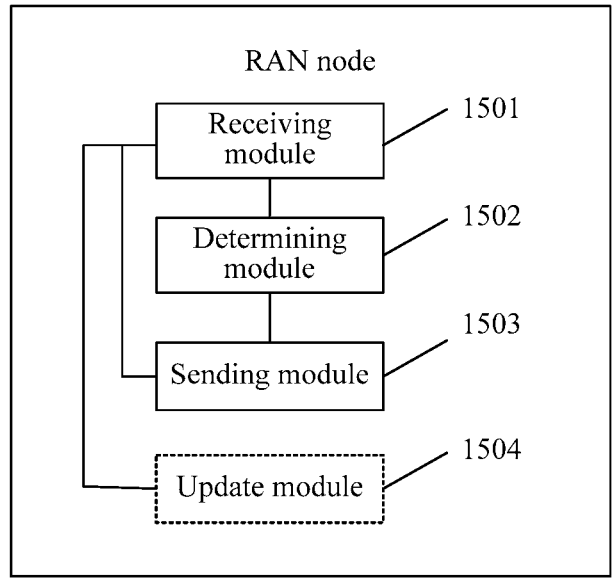
FIG. 15 is a schematic structural diagram of a RAN node according to an embodiment of this application.

When the functional modules are divided by using corresponding functions, an embodiment of this application provides a communications apparatus. The apparatus may be implemented as the RAN node in the foregoing embodiment. As shown in FIG. 15, FIG. 15 is a possible schematic structural diagram of the RAN node in the foregoing embodiment. The RAN node includes a receiving module 1501, a determining module 1502, and a sending module 1503.

The receiving module 1501 is configured to support receiving the first message in step 601 in FIG. 6 and FIG. 7 and the third message in step 704 in FIG. 7 by the RAN node. The determining module 1502 is configured to support the RAN node to perform step 602 in FIG. 6 and step 701 in FIG. 7. The sending module 1503 is configured to support the RAN node to perform step 602 in FIG. 6 and step 702, step 705, and step 602 in FIG. 7.

Optionally, the RAN node further includes an update module 1504.

The update module 1504 is configured to support the RAN node to perform step 707 in FIG. 7.

Figure 16:
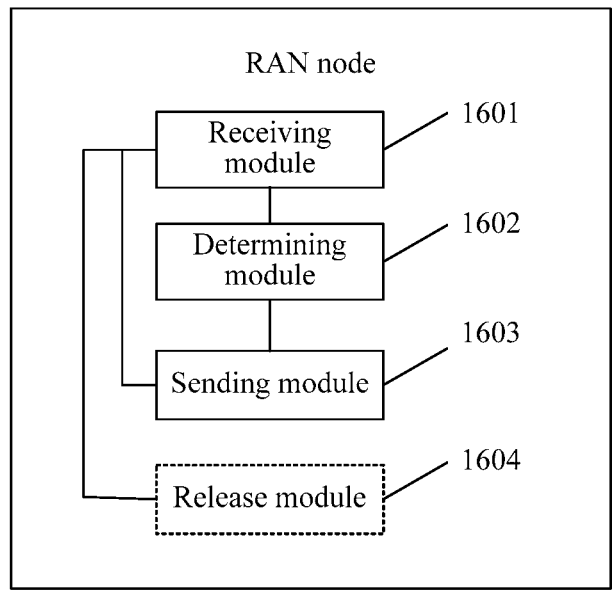
FIG. 16 is a schematic structural diagram of another RAN node according to an embodiment of this application.

As shown in FIG. 16, FIG. 16 is another possible schematic structural diagram of a RAN node. The RAN node includes a receiving module 1601, a determining module 1602, and a sending module 1603.

The receiving module 1601 is configured to support receiving the first message in step 901 in FIG. 9, FIG. 10, and FIG. 11, the third message in step 1004 in FIG. 10 and FIG. 11, and the fourth message in step 1103 in FIG. 14 by the RAN node. The determining module 1602 is configured to support the RAN node to perform step 902 in FIG. 9, FIG. 10, and FIG. 11, step 1101 in FIG. 11, and step 1105 and step 1105 a in FIG. 12. The sending module 1603 is configured to support the RAN node to perform step 902 in FIG. 9, FIG. 10, and FIG. 11 and step 1105 in FIG. 12.

Optionally, the RAN node further includes a release module 1604.

The release module 1604 is configured to support the RAN node to perform step 1005 in FIG. 10 and FIG. 11.

Figure 17:
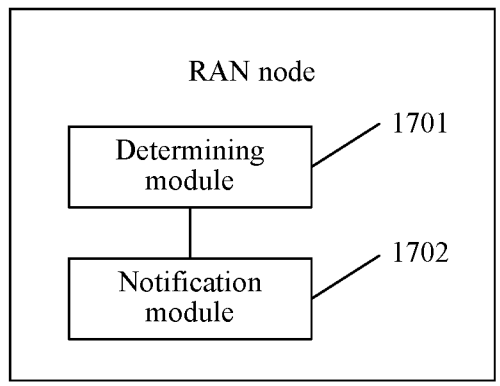
FIG. 17 is a schematic structural diagram of another RAN node according to an embodiment of this application.

As shown in FIG. 17, FIG. 17 is another possible schematic structural diagram of a RAN node. The RAN node includes a determining module 1701 and a notification module 1702.

The determining module 1701 is configured to support the RAN node to perform step 1301 in FIG. 13 and step 1401 and step 1301 in FIG. 14. The notification module 1702 is configured to support the RAN node to perform step 1302 in FIG. 13.

Figure 18:
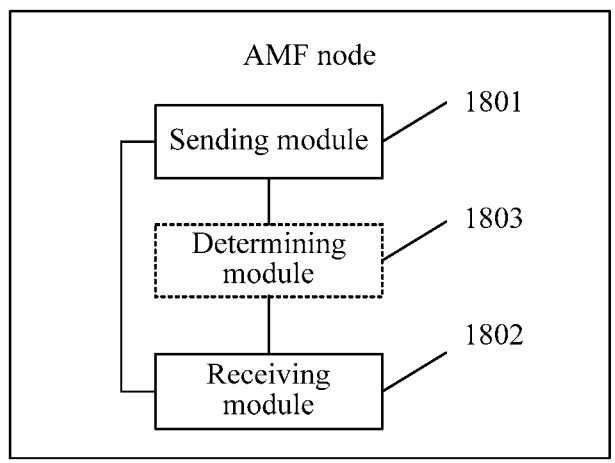
FIG. 18 is a schematic structural diagram of an AMF node according to an embodiment of this application.

When the functional modules are divided by using corresponding functions, an embodiment of this application provides a communications apparatus. The apparatus may be implemented as the AMF node in the foregoing embodiment. As shown in FIG. 18, FIG. 18 is a possible schematic structural diagram of the AMF node in the foregoing embodiment. The AMF node includes a sending module 1801 and a receiving module 1802.

The sending module 1801 is configured to support the AMF node to perform step 601 in FIG. 6, step 601 in FIG. 7, step 901 and step 903 in FIG. 9, step 901, step 903, and step 1004 in FIG. 10, step 901, step 903, and step 1004 in FIG. 11, step 1103, step 1106a, and step 1106b in FIG. 12, and step 1403 in FIG. 14.

The receiving module 1802 is configured to support receiving the first location information or the first indication information in step 602 in FIG. 6 and FIG. 7, the first notification message in step 902 in FIG. 9, FIG. 10, and FIG. 11, the seventh message in step 1003 in FIG. 10 and FIG. 11, the location information of the terminal device or the first indication information in step 1105 in FIG. 12, the notification message in step 1302 in FIG. 13 and FIG. 14, and the fourth message in step 1407 in FIG. 14 by the AMF node.

Optionally, the apparatus further includes a determining module 1803.

The determining module 1803 is configured to support the AMF node to perform step 1106a in FIG. 12.

Figure 19:
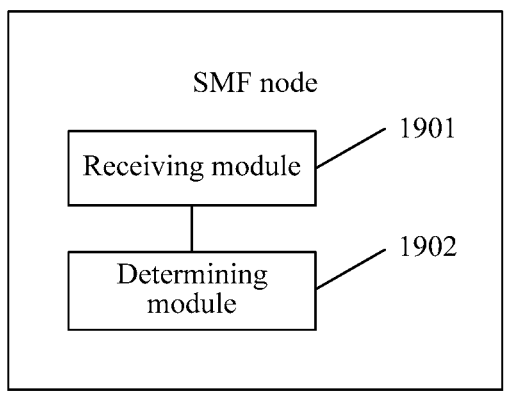
FIG. 19 is a schematic structural diagram of an SMF node according to an embodiment of this application.

When the functional modules are divided by using corresponding functions, an embodiment of this application provides a communications apparatus. The apparatus may be implemented as the SMF node in the foregoing embodiment. As shown in FIG. 19, FIG. 19 is a possible schematic structural diagram of the SMF node in the foregoing embodiment. The SMF node includes a receiving module 1901 and a sending module 1902.

The receiving module 1901 is configured to support the SMF node to perform step 602 in FIG. 6 and FIG. 7, and receiving the second notification message in step 903 in FIG. 9, FIG. 10, and FIG. 11, the location information of the terminal device or the first indication information in step 1105 and the first indication information in step 1106a or step 1106b in FIG. 12, and the notification message in step 1403 and the third message in step 1046 in FIG. 13.

The sending module 1902 is configured to support sending the fifth message in FIG. 9 and FIG. 10 by the SMF node, and is further configured to support the SMF node to perform step 1003 in FIG. 9 and FIG. 10, step 1107 in FIG. 12, and step 1407 in FIG. 14.

For all related content of the steps in the foregoing method embodiments, refer to function descriptions of the corresponding functional modules, and details are not described herein again.

Figure 20:
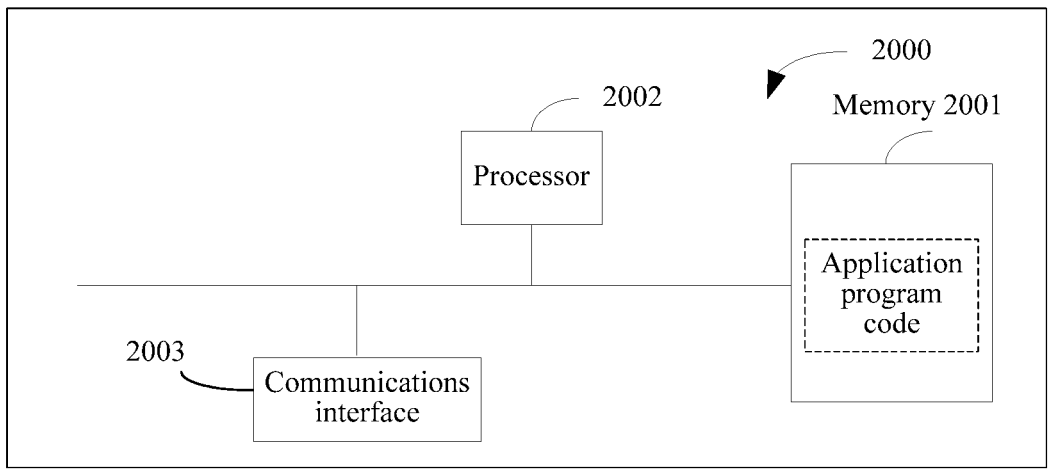
FIG. 20 is a schematic structural diagram of a RAN node according to an embodiment of this application.

As shown in FIG. 20, a RAN node 2000 may include a memory 2001, a processor 2002, a communications interface 2003, and a bus 2004. The bus 2004 is configured to implement a connection and mutual communication between these apparatuses.

The communications interface 2003 may be implemented by using an antenna, and may be configured to exchange data with an external network element, for example, the communications interface 2003 may receive/send a data packet or other information from/to an AMF device.

The processor 2002 may be a central processing unit (CPU), or an application-specific integrated circuit (ASIC), or one or more integrated circuits configured to implement the embodiments of the present invention, for example, one or more microprocessors (DSP) or one or more field programmable gate arrays (FPGA). The processor 2002 has a processing and management function. Specifically, the processor 2002 may process received data or information sent by the AMF device, a UPF device, or a PCRF device, or process information or data sent by another device.

The memory 2001 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM), or another optical disk storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction or a data structure and can be accessed by a computer, but is not limited thereto. The memory 2001 may exist independently, and is connected to the processor 2002 by using the bus 2004. The memory 2001 may alternatively be integrated with the processor 2002.

It should be noted that, the receiving module 1501 and the sending module 1503 shown in FIG. 15, the receiving module 1601 and the sending module 1603 shown in FIG. 16, and the notification module 1702 shown in FIG. 17 may be integrated into the communications interface 2003 shown in FIG. 20, so that the communications interface 2003 performs specific functions of the receiving module 1501 and the sending module 1503 shown in FIG. 15, the receiving module 1601 and the sending module 1603 shown in FIG. 16, and the notification module 1702 shown in FIG. 17. The determining module 1502 and the update module 1504 shown in FIG. 15, the determining module 1602 and the release module 1604 shown in FIG. 16, and the determining module 1701 shown in FIG. 17 may be integrated into the processor 2002 shown in FIG. 20, so that the processor 2002 performs specific functions of the determining module 1502 and the update module 1504 shown in FIG. 15, the determining module 1602 and the release module 1604 shown in FIG. 16, and the determining module 1701 shown in FIG. 17.

Figure 21:
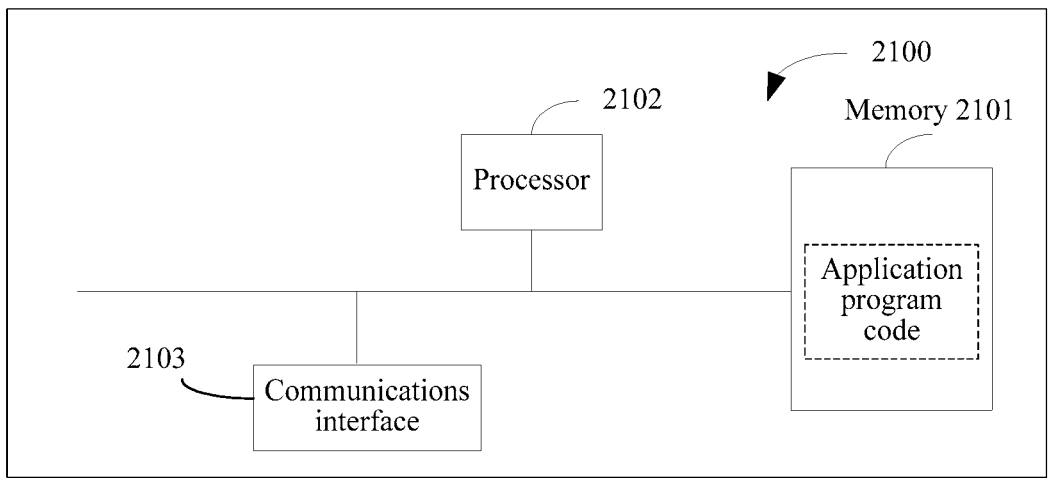
FIG. 21 is a schematic structural diagram of an AMF node according to an embodiment of this application.

As shown in FIG. 21, an AMF node 2100 may include a memory 2101, a processor 2102, a communications interface 2103, and a bus 2104. The bus 2104 is configured to implement a connection and mutual communication between these apparatuses.

The communications interface 2103 may be implemented by using an antenna, and may be configured to exchange data with an external network element, for example, the communications interface 2103 may receive/send a data packet or other information from/to an AMF device.

The processor 2102 may be a central processing unit (CPU), or an application-specific integrated circuit (ASIC), or one or more integrated circuits configured to implement the embodiments of the present invention, for example, one or more microprocessors (DSP) or one or more field programmable gate arrays (FPGA). The processor 2102 has a processing and management function. Specifically, the processor 2102 may process received data or information sent by the AMF device, a UPF device, or a PCRF device, or process information or data sent by another device.

The memory 2101 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM), or another optical disk storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction or a data structure and can be accessed by a computer, but is not limited thereto. The memory 2101 may exist independently, and is connected to the processor 2104 by using the bus 2102. The memory 2101 may alternatively be integrated with the processor 2102.

Figure 22:
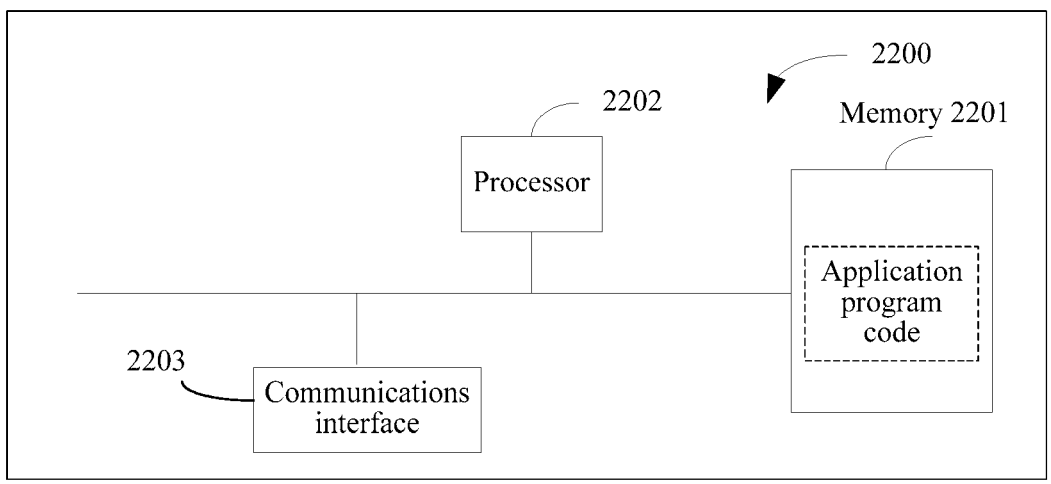
FIG. 22 is a schematic structural diagram of an SMF node according to an embodiment of this application.

It should be noted that, the sending module 1801 and the receiving module 1802 shown in FIG. 18 may be integrated into the communications interface 2203 shown in FIG. 22, so that the communications interface 2203 performs specific functions of the sending module 1801 and the receiving module 1802 shown in FIG. 18. The determining module 1803 shown in FIG. 18 may be integrated into the processor 2202 shown in FIG. 22, so that the processor 2202 performs a specific function of the determining module 1803 shown in FIG. 18.

As shown in FIG. 22, an SMF node 2200 may include a memory 2201, a processor 2202, a communications interface 2203, and a bus 2204. The bus 2204 is configured to implement a connection and mutual communication between these apparatuses.

The communications interface 2203 may be implemented by using an antenna, and may be configured to exchange data with an external network element, for example, the communications interface 2203 may receive/send a data packet or other information from/to an AMF device.

The processor 2202 may be a central processing unit (CPU), or an application-specific integrated circuit (ASIC), or one or more integrated circuits configured to implement the embodiments of the present invention. For example, one or more microprocessors (DSP) or one or more field programmable gate arrays (FPGA). The processor 2202 has a processing and management function. Specifically, the processor 2202 may process received data or information sent by the AMF device, a UPF device, or a PCRF device, or process information or data sent by another device.

The memory 2201 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM), or another optical disk storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of an instruction or a data structure and can be accessed by a computer, but is not limited thereto. The memory 2201 may exist independently, and is connected to the processor 2204 by using the bus 2202. The memory 2201 may alternatively be integrated with the processor 2202.

It should be noted that, the receiving module 1901 and the sending module 1902 shown in FIG. 19 may be integrated into the communications interface 2203 shown in FIG. 22, so that the communications interface 2203 performs specific functions of the receiving module 1901 and the sending module 1902 shown in FIG. 19.

The methods or algorithm steps described with reference to the content disclosed in this application may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, alternatively, the storage medium may be a part of the processor. The processor and the storage medium may be located in an ASIC. In addition, the ASIC may be located in a core network interface device. Certainly, the processor and the storage medium may exist in the core network interface device as discrete components.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual needs to achieve the objectives of the solutions of the embodiments.

In addition, functional units in the embodiments of the present invention may be integrated into one processing unit, or each of the functional units may exist alone, or two or more units are integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to necessary universal hardware or certainly by hardware only. In most circumstances, the former is a preferred implementation. Based on such an understanding, the technical solutions of this application essentially or the part contributing to the prior art may be implemented in a form of a software product. The computer software product is stored in a readable storage medium, such as a floppy disk, a hard disk, or an optical disc of a computer, and includes several instructions for instructing a computer device (which may be a personal computer, a server, or a network device) to perform the methods described in the embodiments of this application.

The foregoing descriptions are merely specific embodiments of this application, but are not intended to limit the protection scope of this application. Any variation or replacement disclosed in this application shall fall within the protection scope of this application. Therefore, the protection scope of this application shall be subject to the protection scope of the claims.

What is claimed is:

1. A communications method, comprising:
sending, by an access and mobility management function (AMF) node, a first message to a radio access network (RAN) node, wherein the first message comprises specified area related information of a terminal device, and the specified area related information indicates a specified area of the terminal device, wherein the specified area related information comprises a location area identifier list corresponding to the specified area, and the location area identifier list is a cell identifier (Cell ID) list or a tracking area identity (TAI) list;
receiving, by the RAN node, the first message;
after receiving the first message, determining, by the RAN node based on the specified area related information and first location information of the terminal device, that the terminal device moves out of the specified area, wherein determining, by the RAN node based on the specified area related information and the first location information of the terminal device, that the terminal device moves out of the specified area comprises:
in case that a location indicated by the first location information is within none of areas indicated by location area identifiers in the location area identifier list corresponding to the specified area, determining, by the RAN node, that the terminal device moves out of the specified area; and
sending, by the RAN node to the AMF node, first indication information, wherein the first indication information indicates that the terminal device moves out of the specified area.

2. The communications method according to claim 1, wherein the specified area is a local area data network service area (LADN SA), a location reporting area, or an area of interest.

3. The communications method according to claim 1, wherein the first message comprises a location report control message.

4. The communications method according to claim 1, wherein before determining, by the RAN node based on the specified area related information and the first location information of the terminal device, that the terminal device moves out of the specified area, the method further comprises:
in case that the RAN node determines to switch the terminal device from a Radio Resource Control (RRC) connected state to an RRC inactive state, determining, by the RAN node, a radio access network notification area (RNA) of the terminal device based on second location information of the terminal device and the specified area related information; and
sending, by the RAN node, a second message to the terminal device, wherein the second message indicates to release an RRC connection between the terminal device and the RAN node, and the second message carries the RNA.

5. A communications system, comprising:
an access and mobility management function node; and
a radio access network (RAN) node, wherein:
the access and mobility management function node is configured to:
    send a first message to the RAN node, wherein the first message comprises specified area related information of a terminal device, and the specified area related information indicates a specified area of the terminal device, wherein the specified area related information comprises a location area identifier list corresponding to the specified area, and the location area identifier list is a cell identifier (Cell ID) list or a tracking area identity (TAI) list; and
the RAN node is configured to:
    receive the first message;
    determine that the terminal device moves out of the specified area based on the specified area related information and first location information of the terminal device by determining that the terminal device moves out of the specified area in case that a location indicated by the first location information is within none of areas indicated by location area identifiers in the location area identifier list corresponding to the specified area; and
    send first indication information to the access and mobility management function node, wherein the first indication information indicates that the terminal device moves out of the specified area.

6. The communications system according to claim 5, wherein the specified area is a local area data network service area (LADN SA), a location reporting area, or an area of interest.

7. The communications system according to claim 5, wherein the first message comprises a location report control message.

8. The communications system according to claim 5, wherein the RAN node is further configured to:
    in case that the RAN node determines to switch the terminal device from a Radio Resource Control (RRC) connected state to an RRC inactive state, determine a radio access network notification area (RNA) of the terminal device based on second location information of the terminal device and the specified area related information; and
    send a second message to the terminal device, wherein the second message indicates to release an RRC connection between the terminal device and the RAN node, and the second message carries the RNA.

9. A communications apparatus, comprising:
at least one processor coupled with a non-transitory storage medium storing executable instructions, wherein the executable instructions, when executed by the at least one processor, cause the communications apparatus to perform operations comprising:
    receiving a first message from an access and mobility management function node, wherein the first message comprises specified area related information of a terminal device, and the specified area related information indicates a specified area of the terminal device, wherein the specified area related information comprises a location area identifier list corresponding to the specified area, and the location area identifier list is a cell identifier (Cell ID) list or a tracking area identity (TAI) list;
    determining, based on the specified area related information and first location information of the terminal device, that the terminal device moves out of the specified area, wherein determining, based on the specified area related information and the first location information of the terminal device, that the terminal device moves out of the specified area comprises:
    in case that a location indicated by the first location information is within none of areas indicated by location area identifiers in the location area identifier list corresponding to the specified area, determining that the terminal device moves out of the specified area; and
    sending first indication information to the access and mobility management function node, wherein the first indication information indicates that the terminal device moves out of the specified area.

10. The communications apparatus according to claim 9, wherein the specified area is a local area data network service area (LADN SA), a location reporting area, or an area of interest.

11. The communications apparatus according to claim 9, wherein the first message comprises a location report control message.

* * * * *